US012299939B2

(12) United States Patent
Harikumar et al.

(10) Patent No.: US 12,299,939 B2
(45) Date of Patent: May 13, 2025

(54) GENERATING NOVEL IMAGES USING SKETCH IMAGE REPRESENTATIONS

(71) Applicant: Adobe Inc., San Jose, CA (US)

(72) Inventors: Midhun Harikumar, Sunnyvale, CA (US); Pranav Aggarwal, Santa Clara, CA (US); Ajinkya Gorakhnath Kale, San Jose, CA (US)

(73) Assignee: Adobe Inc., San Jose, CA (US)

( * ) Notice: Subject to any disclaimer, the term of this patent is extended or adjusted under 35 U.S.C. 154(b) by 371 days.

(21) Appl. No.: 17/808,261

(22) Filed: Jun. 22, 2022

(65) Prior Publication Data

US 2023/0419551 A1 Dec. 28, 2023

(51) Int. Cl.
*G06T 7/10* (2017.01)
*G06T 9/00* (2006.01)

(52) U.S. Cl.
CPC ............... *G06T 9/001* (2013.01); *G06T 7/10* (2017.01); *G06T 9/008* (2013.01)

(58) Field of Classification Search
CPC ........... G06T 9/001; G06T 9/008; G06T 7/10; G06T 11/60
See application file for complete search history.

(56) References Cited

U.S. PATENT DOCUMENTS

2019/0287283 A1\* 9/2019 Lin .......................... G06T 5/60
2020/0082249 A1\* 3/2020 Hua ....................... G06N 3/045

OTHER PUBLICATIONS

Ham et al., CoGS: Controllable Generation and Search from Sketch and Style, Mar. 2022, arXiv: 2203.09554v1, pp. 1-18. (Year: 2022).\*
Bui et al, Sketching out the details: Sketch-based image retrieval using CNN with multi-stage regression, 2018, Computers & Graphics 71 (2018): 77-87. (Year: 2018).\*
Van den Oord et al, Neural Discrete Representation Learning, 2018, arXiv: 1711.00937v2, pp. 1-11. (Year: 2018).\*
Ramesh et al, Zero-Shot Text-to-Image Generation, 2021, arXiv: 2102.12092v2, pp. 1-20. (Year: 2021).\*

(Continued)

*Primary Examiner* — Kathleen M Broughton
(74) *Attorney, Agent, or Firm* — Weaver Austin Villeneuve & Sampson LLP

(57) ABSTRACT

Techniques for generating a novel image using tokenized image representations are disclosed. In some embodiments, a method of generating the novel image includes generating, via a first machine learning model, a first sequence of coded representations of a first image having one or more features; generating, via a second machine learning model, a second sequence of coded representations of a sketch image having one or more edge features associated with the one or more features; predicting, via a third machine learning model, one or more subsequent coded representations based on the first sequence of coded representations and the second sequence of coded representations; and based on the subsequent coded representations, generating, via the third machine learning model, a first portion of a reconstructed image having one or more image attributes of the first image, and a second portion of the reconstructed image associated with the one or more edge features.

20 Claims, 15 Drawing Sheets

(56) References Cited

OTHER PUBLICATIONS

Chang et al, MaskGIT: Masked Generative Image Transformer, Jun. 18, 2022, 2022 IEEE/CVF Conference on Computer Vision and Pattern Recognition, pp. 1-11. (Year: 2022).*
Sampaio Ferraz Ribeiro et al, Sketchformer: Transformer-Based Representation for Sketched Structure, 2020, 2020 IEEE/CVF Conference on Computer Vision and Pattern Recognition, pp. 1-10. (Year: 2020).*
Lim et al, Sketch Tokens: A Learned Mid-level Representation for Contour and Object Detection, 2013, 2013 IEEE Conference on Computer Vision and Pattern Recognition, pp. 1-8. (Year: 2013).*
Qi et al, Sketch Fewer to Recognize More by Learning a Co-Regularized Sparse Representation, 2020, IEEE Transactions on Circuits and Systems for Video Technology, pp. 1-12. (Year: 2020).*
Zeng et al, SketchEdit: Mask-Free Local Image Manipulation with Partial Sketches, 2021, arXiv: 2111.15078v1, pp. 1-11. (Year: 2021).*
Ghosh et al, Interactive Sketch & Fill: Multiclass Sketch to Image Translation, 2019, arXiv: 1909.11081v2, pp. 1-16. (Year: 2019).*
Brownlee, J. "Autoregression Models for Time Series Forecasting With Python", Machine Learning Mastery, Jan. 1, 2017 (revised Sep. 7, 2021), 18 pages. URL: https://machinelearningmastery.com/autoregression-models-time-series-forecasting-python/#:~:text=Autoregression%20is%20a%20time%20series,range%20of%20time%20series%20problems [retrieved Aug. 25, 2022].
Li, F. et al. "Comparison of Feature Learning Methods for Human Activity Recognition Using Wearable Sensors", Sensors, Feb. 2018, 18(3):679, pp. 1-22. URL: https://www.researchgate.net/publication/323423384_Comparison_of_Feature_Learning_Methods_for_Human_Activity_Recognition_Using_Wearable_Sensors [retrieved Aug. 25, 2022], DOI: 10.3390/s18020679.
Salimans, T. et al. "PixelCNN++: Improving the PixelCNN with Discretized Logistic Mixture Likelihood and Other Modifications", Proc. of the 5th International Conference on Learning Representations, 2017, pp. 1-10.
Snell, C. "Understanding VQ-VAE (DALL-E Explained Pt. 1)", ML@B Blog, Feb. 9, 2021, University of California, Berkeley (US), 14 pages. URL: https://ml.berkeley.edu/blog/posts/vq-vae/ [retrieved Aug. 26, 2022].
STAT946F17 [wiki]. "Conditional Image Generation with PixelCNN Decoders", page last modified on Dec. 4, 2017, University of Waterloo (Canada), 16 pages. URL: https://wiki.math.uwaterloo.ca/statwiki/index.php?title=STAT946F17/Conditional_Image_Generation_with_PixelCNN_Decoders [retrieved Aug. 25, 2022].
Wikipedia.org. "Transformer (machine learning model)", Aug. 25, 2019 (revised Aug. 12, 2022), 10 pages. URL: https://en.wikipedia.org/wiki/Transformer_(machine_learning_model) [retrieved Aug. 26, 2022].

\* cited by examiner

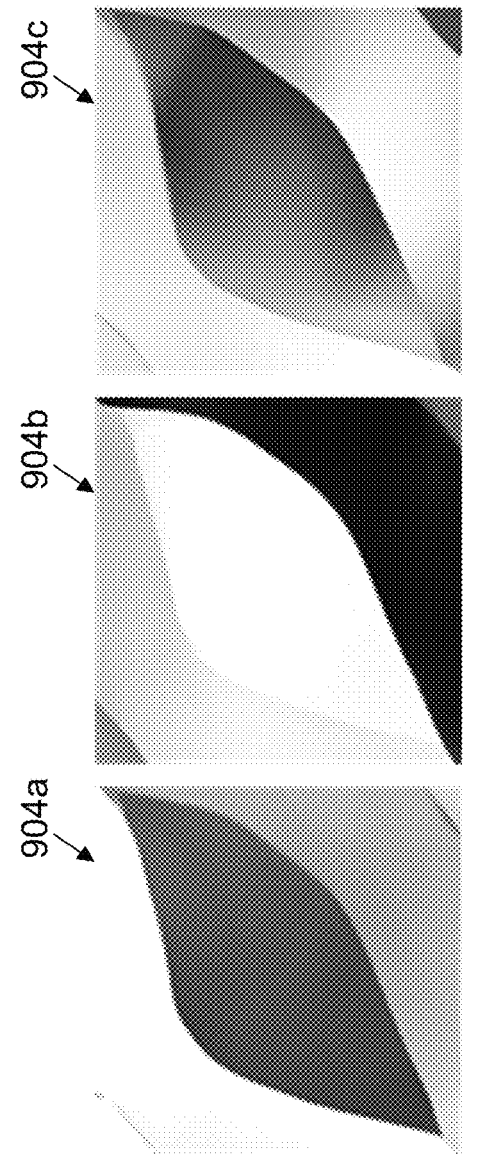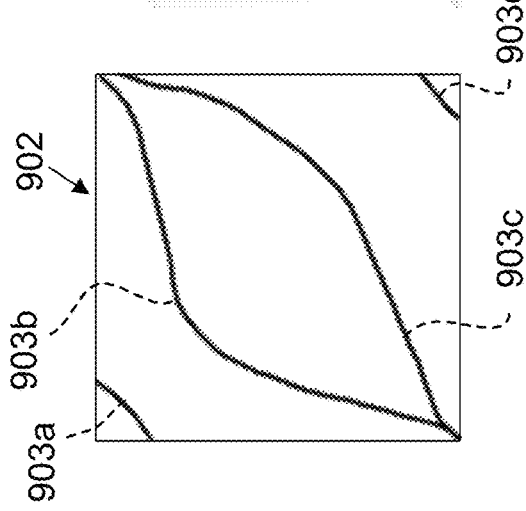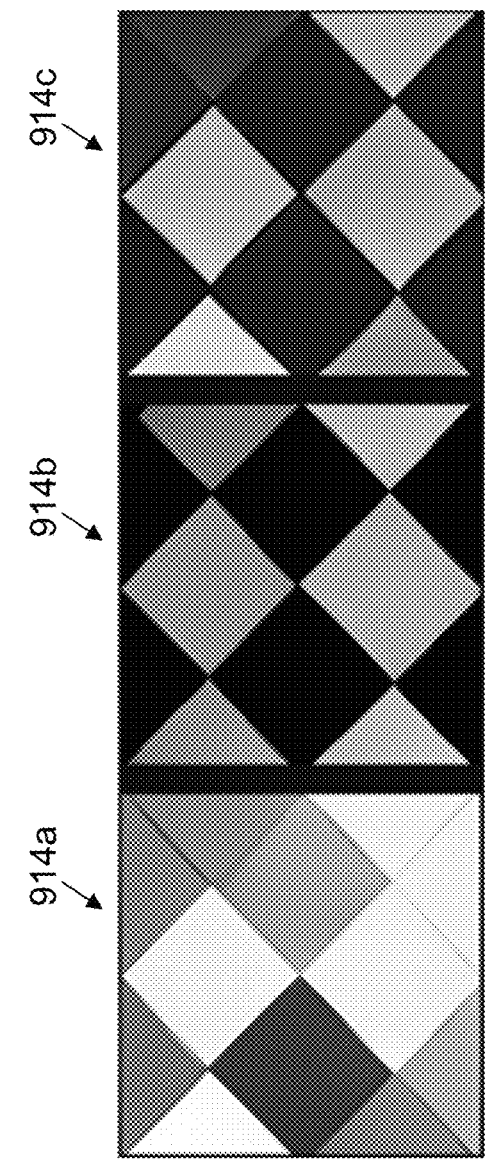
FIG. 9A
FIG. 9B

GENERATING NOVEL IMAGES USING SKETCH IMAGE REPRESENTATIONS

BACKGROUND

1. Field of Disclosure

The present disclosure relates generally to the field of machine learning, and more particularly, using machine learning models trained on images and sketches of images to predict tokens representative of new images.

2. Description of Related Art

"Backgrounds" are a commonly used asset for creating images or editing images. Background images are also a commonly sought asset in image editing platforms (indicated by, e.g., a high number of queries). For certain content creation processes, the first step is finding an appropriate background image or artwork. Once a desired background image is found, users may desire alterations to the image. For example, one such alteration is adding copy space, which is an area of an image that is clear and uncluttered, often free of background objects, and thus suitable for text copy to be placed. In another example, the user may attempt to edit the background image nondestructively while maintaining its style and content semantics. Additionally, a user may wish to draw a sketch over the image, or create a new image using the sketch.

SUMMARY

Techniques for generating a novel image using tokenized image representations are disclosed in the present disclosure.

In one aspect of the present disclosure, a method of generating a novel image is disclosed. In some embodiments, the method includes: generating, via a first machine learning model, a first sequence of coded representations of a first image having one or more features; generating, via a second machine learning model, a second sequence of coded representations of a sketch image having one or more edge features associated with the one or more features of the first image; predicting, via a third machine learning model, one or more subsequent coded representations based on the first sequence of coded representations of the first image and the second sequence of coded representations of the sketch image; and based on the one or more subsequent coded representations, generating, via the third machine learning model, at least (i) a first portion of a reconstructed image which has one or more image attributes of the first image, and (ii) a second portion of the reconstructed image which is associated with the one or more edge features.

In another aspect of the present disclosure, a system of predicting a novel image is disclosed. In some embodiments, the system includes: a first machine learning model trained to: obtain an image, the image including one or more features; and encode the image into first tokenized representations; a second machine learning model trained in conjunction with the first tokenized representations to: obtain a sketched version of the image including one or more edge structures corresponding to the one or more features of the image; and encode the sketched version of the image into second tokenized representations; and a third machine learning model trained to: obtain the first tokenized representations and the second tokenized representations; predict one or more subsequent tokenized representations based on the first tokenized representations and the second tokenized representations; and generate the novel image based on the predicted one or more subsequent tokenized representations.

In another aspect of the present disclosure, a computer-readable apparatus is disclosed. In some embodiments, the computer-readable apparatus includes a storage medium, the storage medium having a plurality of instructions configured to, when executed by one or more processors, cause a machine learning model implemented by an image encoder to: obtain one or more strokes representing one or more edge features of an input image; encode the one or more strokes into a plurality of image tokens associated with the one or more edge features and having a sequence; and cause iterative prediction of one or more subsequent image tokens accounting for the sequence of the plurality of image tokens, the one or more subsequent image tokens being decodable into a reconstructed image having one or more image features corresponding to the one or more edge features.

BRIEF DESCRIPTION OF THE DRAWINGS

FIGS. 9A, 9B and 10 are examples of a conversion of a user-generated sketch image to various novel background images, according to some embodiments.

Like reference numbers and designations in the various drawings indicate like elements.

DETAILED DESCRIPTION OF EMBODIMENTS

Figure 1:
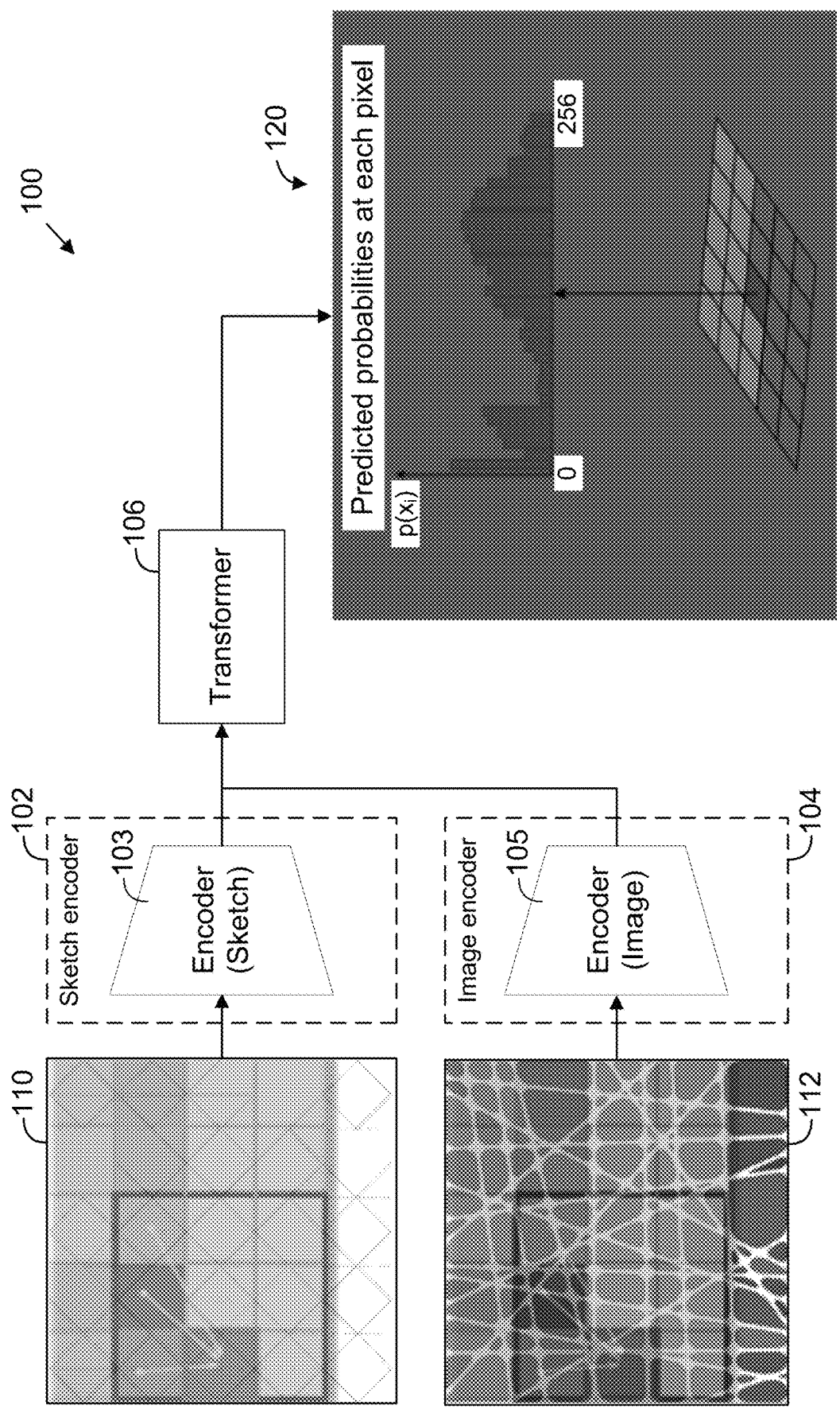
FIG. 1 is a block diagram of an architecture of a sketch encoder model, an image encoder model, and a transformer model, which are collectively implemented to generate predictions of image tokens, according to some embodiments.

In many cases, background images are abstract and cannot be described well with common vocabulary. Hence, users can spend much time sifting through many assets (e.g., thousands of images) to find an image that is particularly fitting for their use case. Further, with growing collections of stock images, it has become increasingly difficult to find the right type of content that satisfies the design direction of a user's project.

Moreover, it is difficult to alter the structure without spending time with image editing tools (such as Adobe® Photoshop®, Canva®, Microsoft® Paint, etc.). For example, alterations such as adding copy space, once made, cannot be quickly adjusted to other areas of an image unless it is redone from the beginning. This process requires both patience and technical skill. In another example, editing the background image nondestructively while maintaining its style and content semantics requires careful editing, which involves time and skill to achieve.

A common way to generate background images is to use image editing tools to create vector art or design a custom background layout or design. This process in most cases is a tedious and time-intensive process (e.g., taking hours). In the case of many existing cloud-based platforms such as Canva®, there is a collection of dedicated assets to use as backgrounds and they cannot be modified apart from the basic operations such as cropping and resizing. These tool also do not have variations of an image, other than a few manually created versions, and require users to stick to the templates provided. These templates cannot add copy space or be edited spatially while preserving its visual style. They cannot adaptively create a copy space when text is placed over them.

Approaches to solve this problem exist in the machine learning space. One example is a generative modeling technique that can create a new image from a learned distribution. Editing of background images in a generative space have been explored, but these techniques are either low fidelity or will require regenerating an entirely new image and may not be faithful to the style of the original image. Another method is to use mathematical patterns to generate repetitive patterns and effects. These techniques are limited to the bounds of a mathematical function and are not generalizable to many kinds of backgrounds. They also perform poorly on blending designs together and need to be post-processed offline using image editing tools.

Hence, it is desirable to implement an image-generation solution that encodes image data from the "ground up" to overcome the aforementioned issues relating to limited options, style preservation, quality, and fidelity. Such a solution would allow generation of novel images, including background images, that can flexibly cater to user needs for image manipulation while preserving the style of the image.

Term Definitions

As used herein, in the context of this disclosure, the term "machine learning model" or "model" (in the context of machine learning) refers to a computational algorithm that indicates relationships between input variables and output variables. In some embodiments, a machine learning model may be trained. Training a machine learning model may involve, among other things, determining values of weights associated with one or nodes of a neural network of the machine learning model, where relationships between the input variables and the output variables are based at least in part on the determined weight values. In one example, a machine learning model may be trained in a supervised manner using a training set that includes labeled training data. In a more particular example, the labeled training data may include inputs and manually annotated outputs that the machine learning model is to approximate using determined weight values. In other embodiments, a machine learning model may be trained in an unsupervised manner in which weight values are determined without manually labeled training data.

As used herein, in the context of this disclosure, a "module" refers to at least a portion of computer-executable instructions. In some embodiments, a module is implemented by a hardware processor configured to execute the corresponding computer-executable instructions. A hardware processor is an integrated circuit device associated with a computing device, such as a server or a user device (e.g., a desktop computer, a laptop computer, a tablet computer, a mobile phone, or the like), which is programmable to perform specific tasks. In some embodiments, multiple modules are implemented as a single module. In some embodiments, a single module is implemented as multiple modules. In some embodiments, two or more modules are executable by the same device (e.g., the same server, the same computing device).

Figure 3:
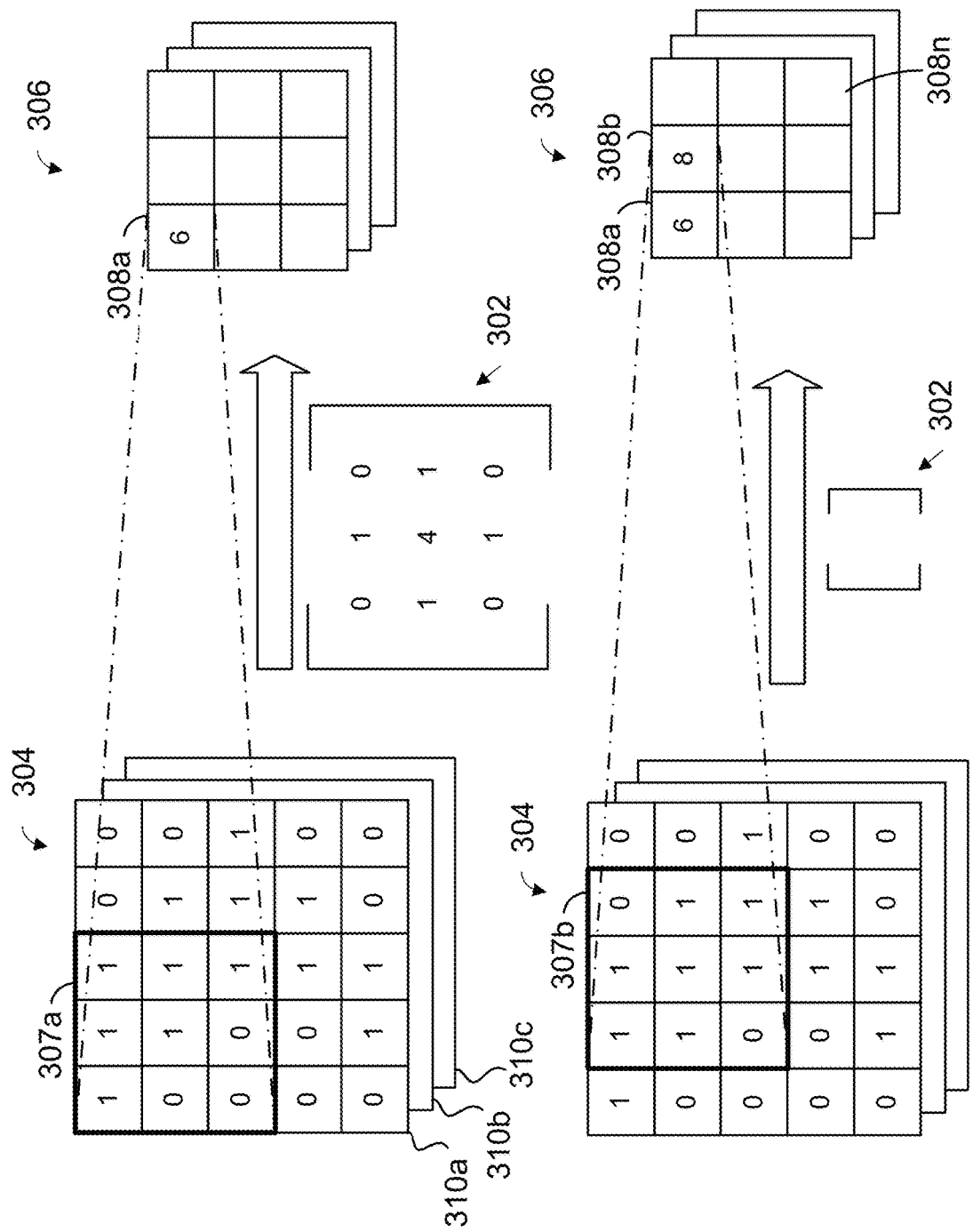
FIG. 3 illustrates an example image convolution in which a kernel matrix is applied to pixel values of an image to generate a portion of a feature map.

As used herein, in the context of this disclosure, the term an "image token," "token," or "tokenized representation" refers to a value generated by a neural network or a parametric model (a model represented by learnable parameters) constructed to learn and/or perform encoding or transformation of an image. In some embodiments, a convolutional neural network (CNN) implements convolution based on a filter or a "kernel" applied over some of the pixels of an input image. In some implementations, tokens are contained in a feature map generated based on convolution of an image. FIG. 3, discussed in more detail below, illustrates an example of generation of tokens (e.g., 308*a*, 308*b*).

As used herein, in the context of this disclosure, the term "conditioning" refers to feeding information to a neural network. For example, an image is fed to an encoder and its CNN, or token representations are fed to a machine learning model, along with other information such as labeled data, class, etc.

As used herein, in the context of this disclosure, neural "hallucination" and "hallucinated" images refers to inclusion of pixels, edges, and/or image features, or representations thereof (e.g., image tokens), that do not exist in an input image.

As used herein, in the context of this disclosure, a "layer" refers to a group of nodes of a neural network which are used for a particular task. Some or all nodes of a layer contain data, such as values, weights, null data, etc., and can form, individually or in combination, vertices and matrices.

As used herein, in the context of this disclosure, an "encoder" refers to a computerized device, or an instance of such a device, which is configured to execute at least a portion of computer-executable instructions to convert data into a desired format. Encoders may be hardware encoders, software encoders (e.g., encoder instances), or a combination thereof. An image encoder is configured to receive input image data and output image data in another format (e.g., a compressed or downsampled format). For example, an image encoder generates or predicts image tokens using a neural network. In some implementations, a CNN is used to predict image tokens.

As used herein, in the context of this disclosure, a "decoder" refers to a computerized device, or an instance of such a device, which is configured to execute at least a portion of computer-executable instructions to convert encoded data into a desired format, such as an original format or an intermediate format. Decoders may be hardware decoders, software decoders (e.g., decoder instances), or a combination thereof. An image decoder is configured to receive encoded image data and output image data in another format (e.g., a decompressed format). For example, the image decoder receives encoded image data (e.g., image tokens, feature map) and generates an image (or an upsampled version of the encoded image data) based on the encoded image data.

As used herein, in the context of this disclosure, a "codebook" is a visual dictionary of a set of visual words (or codewords) that represent one or more feature vectors of one or more images. Put differently, the codebook is a mapping between a token and a learned vector representation (also known as an embedding), the vector representation learned while training an encoder and a corresponding decoder to optimize for the best tokenized representations that reconstruct an image. A codebook can contain a list of vectors associated with a corresponding index. A codebook can also be used to quantize the bottleneck, the bottleneck referring to the most compressed or most encoded version of the input image (representable by a layer between the encoder layers and the decoder layers), which can be subsequently decompressed or decoded into a reconstruction of the input image.

Encoder Models for Predicting Image Tokens

FIG. 1 illustrates a block diagram of an architecture 100 of a sketch encoder model 102, an image encoder model 104, and a transformer model 106, which are collectively implemented to generate predictions of image tokens, according to some embodiments. In some embodiments, the sketch encoder model 102 includes a corresponding first encoder 103, which will be described in additional detail below with respect to FIG. 3. The first encoder 103 is configured to receive a sketch image 110. In different embodiments, the sketch image 110 is a set of strokes or curves (e.g., rasterized curves, vectorized curves), or vector paths, which define edge lines and no other features in the image. In some embodiments, the image encoder model 104 includes a corresponding second encoder 105. The second encoder 105 is configured to receive an image 112. In some implementations, the image 112 is not an image of the type that sketch image 110 is. Examples of the image 112 include an RGB (red-green-blue) image, or any image having pixels, including raster images. In some cases, the image 112 is a vectorized image. However, inputs to the models (e.g., sketch encoder model 102 and the image encoder model 104), inputs including the sketch image 110 and the image 112, are rasterized. While images (e.g., image 112) and sketch images (e.g., 110) can have the style and look of vector images, but the models are configured to consume raster images. Any vectors or vector files are converted to raster images before being fed to the models.

In some embodiments, the encoder 103 and decoder 105 are a CNN encoder and a CNN decoder, respectively. In various other embodiments, the encoder 103 and decoder 105 are transformer models, Multilayer Perceptron (MLP) models, or other image classification models.

In some cases, the sketch image 110 for the sketch encoder model 102 has been generated from another, originating image. In some implementations, the originating image is the image 112. That is, in some implementations, the image 112 and the corresponding sketch image 110 are fed into respective encoder models, e.g., image encoder model 104 and sketch encoder model 102 respectively.

In some embodiments, the sketch encoder model 102 is configured to receive the sketch image 110 and output a first series of image tokens, and the image encoder is configured to output a second series of image tokens. The transformer model 106 is configured to perform a language modeling task to predict the next image token in a series (e.g., image tokens for an input RGB image such as image 112 or image tokens for an input sketch image such as sketch image 110) by masking the last token from the ground truth. In some implementations, the transformer model 106 is a Generative Pretrained Transformer (GPT), such as minGPT.

As an operational example of the architecture 100, the number of tokens for an example 256×256-sized input image is 16×16. The 16×16 token representations are used as conditioning while training the transformer model 106. For example, 256×256-sized input image is the sketch image 119, which is fed to the sketch encoder model 102 and the first encoder 103. The resulting 16×16 sketch token representations are fed to the transformer model 106. In some implementations, the transformer model is configured to perform a next image token prediction given 256 (16×16 sketch token representations)+256 (16×16 image token representations)−1 (ground truth)=511 context tokens. In some embodiments, during inference (test time), the conditioning from edge features (e.g., from sketch image tokens from sketch encoder model 102) helps the transformer predict the next image tokens autoregressively (one token at a time in serial fashion keeping previous predictions in context). Repeating this process over the entire image canvas (which may be resized to be larger or smaller than the input image) novel backgrounds can be predicted by the transformer model 106 and form high-resolution background images. Predictions of tokens is discussed further with respect to FIG. 5.

In some cases, the number of tokens is 32×32, 64×64, etc. The number of tokens selected to use for conditioning is based on the capabilities of the architecture, the encoder, and/or the decoder.

In some embodiments, the transformer model 106 generates a histogram 120, which is a distribution of predicted probabilities of pixel values for each pixel or each channel (e.g., color) of a pixel. In some implementations, the probabilities of pixel values are determined based on a distribution function. In some implementations, the probabilities of pixel values are associated with predicted tokenized representations, such as those predicted by the transformer model 106, e.g., according to the approach of FIG. 6 discussed below. In some implementations, the highest-probability value is selected as the pixel value for a given predicted tokenized representation.

Figure 2:
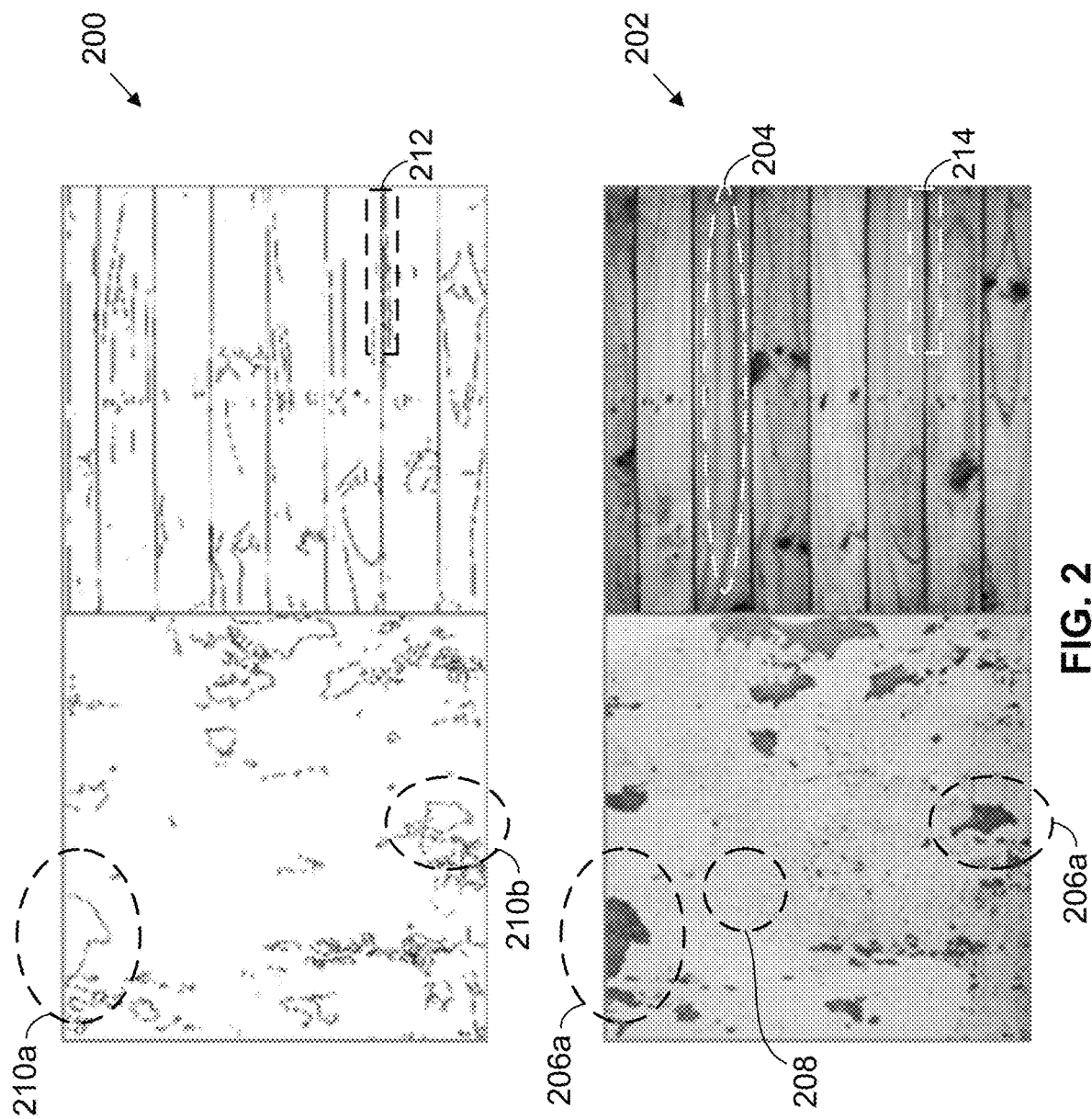
FIG. 2 illustrates examples of sketch images and examples of images from which the sketch images are generated.

FIG. 2 illustrates examples of sketch images 200 and examples of images 202 from which the sketch images 200 are generated. In some embodiments, one of the sketch image 200 is an example of the sketch image 110, and one of the images 202 is an example of the image 112.

In some embodiments, sketches or lines within the sketch images 200 are generated by using a different deep learning model (e.g., other than the sketch encoder model 102 or the image encoder model 104) that is trained to refine the edges of images 202 to sketch-like strokes. The sketch representations in sketch images 200 are chosen to highlight the predominant structure of the images 202 and provide a hint or guide as to where leading edges and other details are located in the images 202, while masking finer textures and noise (e.g., secondary patterns 204, regions 206a, 206b filled in with a different color than the background or other regions, background regions 208 having grainy features). Note the lack of edge features corresponding to the finer textures or noise within sketch image 200, while the predominant structure is preserved. For example, the sketch image 200 include sketch-like strokes 210a and 210b corresponding to the outlines of regions 206a and 206b, and sketch-like strokes 212 corresponding to the outlines of boundaries 214.

Using a CNN, an image can be represented as a matrix of pixel values. In some implementations, a CNN is configured to apply a filter or a "kernel" over some of the pixels of an input image to generate a representation of the pixels the kernel is applied to. According to different implementations, the kernel is a matrix that allows an element-wise multiplication of respective values associated with the pixels. As but one example, the below 3×3 kernel matrix (useful in, e.g., feature edge detection) can be convolved with pixel values of an input image and generate a sum of the multiplication of the kernel and the pixel values:

$$\begin{bmatrix} 0 & 1 & 0 \\ 1 & 4 & 1 \\ 0 & 1 & 0 \end{bmatrix}$$

In some embodiments, a feature map is then produced based on the convolution, where the feature map has the convolved values. The dimensions of the feature map are smaller than those of the kernel (3×3) since the sum of the product of the kernel and the pixels has a 1×1 value. In the context of the present disclosure, the values contained in this feature map may be referred to as "tokens" or "tokenized representations."

FIG. 3 illustrates an example image convolution in which a kernel matrix 302 is applied to pixel values of an image 304 to generate a portion of a feature map 306. More specifically, a convolution value 308a is determined based on the product of the pixel values 307a (the nine values within the 3×3 matrix indicated by the square outline). The kernel matrix 302 takes "strides" or steps of one pixel as it moves or "slides" along the image. As used herein, a "stride" refers to a parameter utilized to indicate a number of pixels over which the kernel matrix 302 traverses over an image. Larger values of the stride correspond to skipping over larger numbers of pixels, and vice versa. A larger stride can generate a more compressed image relative to a smaller stride. In some examples, the stride is an integer value, such as 1, 2, 3, 5, etc. In some implementations, strides are larger, e.g., steps of two pixels. Returning to FIG. 3, in the next stride, the kernel matrix 302 generates another convolution value 308b based on the pixel values 307b, and so on. Convolution is useful for feature detection, feature extraction, reduction of parameters, image classification, and the like. As one example, convolution is useful for detecting edges in a sketch image, which includes lines and otherwise featureless regions.

In some embodiments, the image 304 is associated with multiple channels that correspond to respective colors. For example, the image 304 has a channel 310a for red pixels, a channel 310b for green pixels, and a channel 310c for blue pixels. In some implementations, the kernel matrix 302 slides over the channels 310a-c to generate a corresponding set of feature maps.

In some embodiments, the final tokens, or convolution values 308a-n, form at least one grid making up the feature map 306. In some scenarios, the feature map 306 is a downsampled version of the image 304, and further convolutions may take place using the same kernel or a different kernel (including a differently sized kernel). In some cases, the downsampling of the image 304 results in a lower-resolution or lower-fidelity version of the image 304. The feature map 306 can be decoded into an image, e.g., the image 304 that as originally encoded into the tokens.

Figure 4:
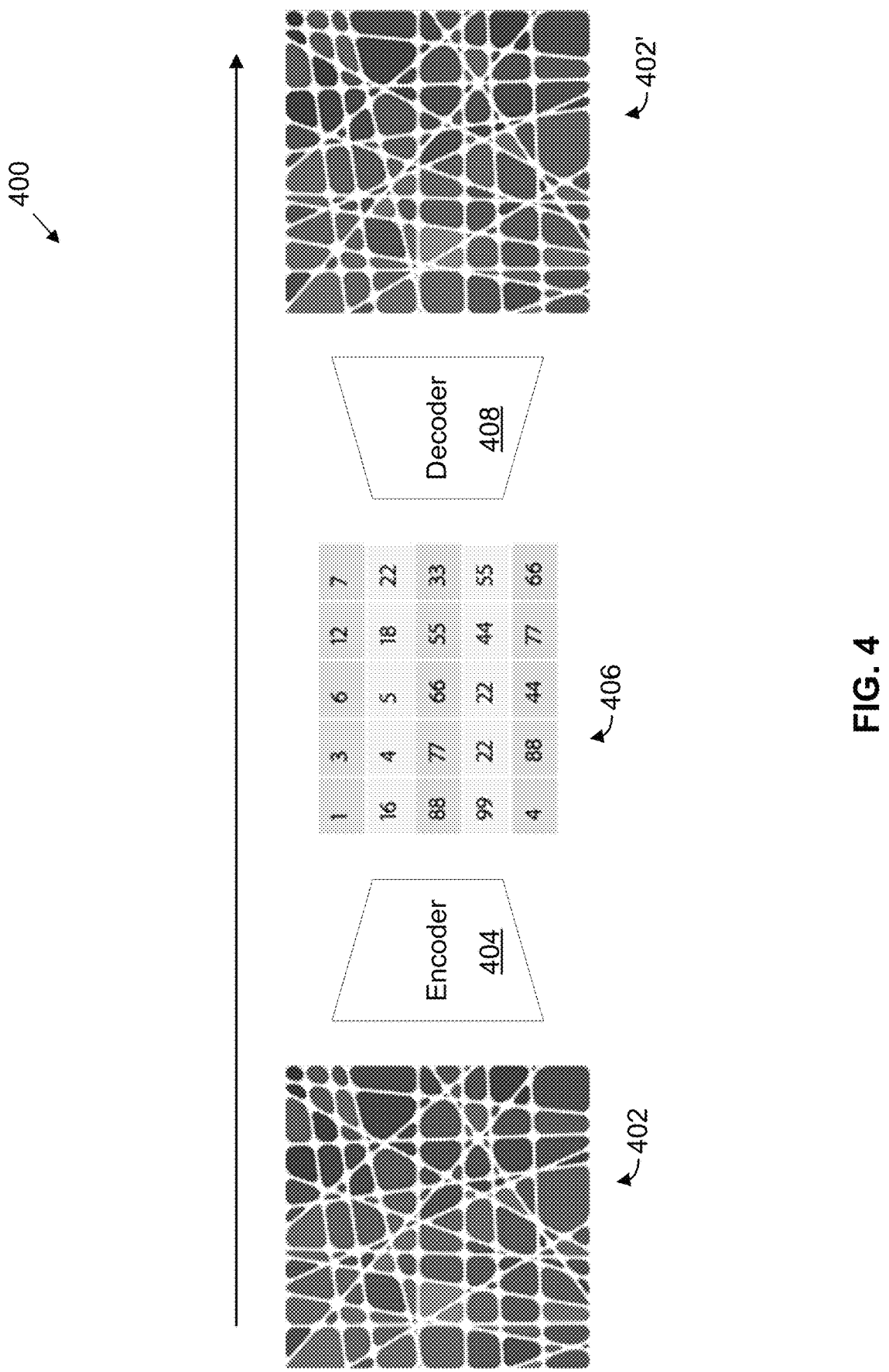
FIG. 4 is a block diagram of an encoder-decoder architecture, which includes an encoder-decoder pair having an encoding process (e.g., via an encoder) that generates tokenized representations from an input image, and a decoding process (e.g., via a decoder) that generates a reconstructed image from the tokenized representations, according to some embodiments.

FIG. 4 illustrates a block diagram of an encoder-decoder architecture 400, which includes an encoder-decoder pair having an encoding process (e.g., via an encoder 404) that generates tokenized representations 406 from an input image 402, and a decoding process (e.g., via a decoder 408) that generates a reconstructed image 402' from the tokenized representations 406, according to some embodiments. In some embodiments, the encoder 404 and decoder 408 are a CNN encoder and a CNN decoder, respectively. In various other embodiments, the encoder 404 and decoder 408 are transformer models, Multilayer Perceptron (MLP) models, or other image classification models. The encoder 404 is configured to receive an input image 402 of various types (sketch image, RGB image, vector image, etc.). In some implementations, for example, where the input image 402 is an image such as the image 112 of FIG. 1, the encoder 404 is an example of the image encoder 104. In some implementations, for example, where the input image 402 is a sketch image such as the sketch image 110 of FIG. 1, the encoder 404 is an example of the sketch encoder 102.

In some embodiments, the tokenized representations 406 is a matrix of convolution values, and hence is a lower-resolution representation of the input image 402. In some examples, the tokenized representations 406 is an example of the feature map 306 of FIG. 3. That is, the values within the tokenized representations 406 represent the input image 402, where the tokenized representations 406 are generated by the encoder 404, e.g., based on convolution as discussed with respect to FIG. 3. In some implementations, the encoder 404 includes a convolution layer configured to perform the convolution.

In some embodiments, the encoder 404 also includes a normalization layer configured to normalize the output of the convolution layer. In some cases, the normalization layer is configured to perform batch normalization, weight normalization, layer normalization, group normalization, or weight standardization.

In some embodiments, the encoder 404 also includes an activation layer. In some implementations, the activation layer is configured to perform Rectified Linear Unit (ReLU) activation on the normalized feature map. ReLU activation includes introduction of non-linearity, useful for backpropagation of errors when training a neural network. That is, all the negative values in the feature map from the convolution are replaced with zeroes, resulting in deactivation of a node if the output of the linear transformation is less than 0. Such functionality may be represented as $ReLU(x)=max(0, x)$. In some implementations, other types of ReLU functionality are used. As an example, Leaky ReLU can be used, which has a small positive slope in the negative area. Such functionality may be represented as, for example, $LReLU(x)=\alpha x$ for $x<0$; $x$ for $x \geq 0$. $\alpha$ may be a fractional value, e.g., 0.1, 0.01. Other examples include Parametric ReLU (PReLU) and Exponential Linear Unit (ELU).

In some embodiments, the encoder 404 also includes a pooling layer configured to reduce the dimensionality of each rectified feature map from the activation layer, while retaining the most important information. In some implementations, max pooling is used, which includes defining a spatial neighborhood (e.g., a 2×2 window) from a rectified feature map, and taking the largest element from the rectified feature map within that window. Similar to the convolution of convolution layer (e.g., as shown in FIG. 3), a stride of 1, 2, or more may be taken to obtain the maximum value from the window. In some implementations, a 2×2 window for max pooling is applied. However, it is recognized that other window sizes may be selected for max pooling. In addition, in some implementations, other types of spatial pooling are used, e.g., average pooling, mean pooling, sum pooling (sum of inputs). The pooling layer thereby generates another convolutional representation, e.g., a downsampled output array of pixel values containing, e.g., maximum values from the window applied across the input rectified feature map. The foregoing layers are collectively be referred to as encoder layers or a set of encoder layers. The encoder layers can be repeated on the downsampled output to further downsample the input image 402.

In some embodiments, the tokenized representations 406 are outputted from convolution only. In some embodiments, the tokenized representations 406 are outputted from multiple ones of the encoder layers. For example, in some cases, the tokenized representations 406 are the output of the pooling layer. In some embodiments, a transformer (e.g., 106) and/or attention layers are present between the encoder 404 and the decoder 408.

In some embodiments, the decoder 408 is configured to receive the tokenized representations 406 to generate the reconstructed image 402'. The reconstructed image 402' is substantially the same as the input image 402, and is upsampled by the decoder 408 from the tokenized representations 406 into the original resolution of the input image 402. Put another way, the decoder 408 is configured to project the tokenized representations 406 back onto the pixel space.

In some embodiments, the decoder 408 includes an upsampling layer configured to upsample the input, e.g., the tokenized representations 406. In some implementations, upsampling is accomplished via an interpolation filter that is configured to perform, e.g., bilinear interpolation.

In some embodiments, the decoder 408 includes a deconvolution layer configured to use information passed from the final set of encoder layers of the encoder. In some implementations, the information passed includes original values that have been pooled (e.g., values that were max pooled in the pooling layer of the final set of encoder layers). In some cases, the information further includes other pixel information, transform information (e.g., an indication that max pooling function was used by the pooling layer), and/or feature map information. In some implementations, the filter window for deconvolution has defined dimensions, e.g., 3×3.

In some embodiments, the decoder 408 includes, similar to the encoder layers, a normalization layer and an activation layer (e.g., ReLU activation layer), which are configured to perform substantially similar functions as those described above.

The foregoing set of decoder layers (one or more of upsampling layer, deconvolution layer, normalization layer, activation layer) thereby generates a deconvolutional representation. In some cases, the deconvolutional representation is the reconstructed image 402' (e.g., if there is one set of decoder layers that performs one upsampling). In some cases, substantially similar operations are performed with subsequent set(s) of decoder layers, further upsampling the input image and generating deconvolutional representations with increased dimensions.

In some cases, the final layer of the decoder layers the decoder 408 includes a softmax layer configured to use a logistic function to classify inputs, producing a probability from 0 to 1. In some implementations, the probability indicates the probability of the demarcation lines (e.g., the pixels making up feature lines, boundary lines, sketch lines) being a valid boundary. In some cases, the highest-probability pixels (e.g., above a threshold or a prescribed percentile of probability relative to other pixels) are selected to indicate the demarcation lines belonging to actual boundaries in the reconstructed image 402'.

Therefore, predicting the tokenized representations using CNNs is highly useful for generating images. In the context of additional input, such as a sketch image, edge conditioning can be performed to enable a transformer model to predict image tokens that form, e.g., novel backgrounds and high-resolution background images that preserve the style of the input image. To enable an encoder to predict tokenized representations, the encoder is trained.

Training Encoder Models

Figure 5:
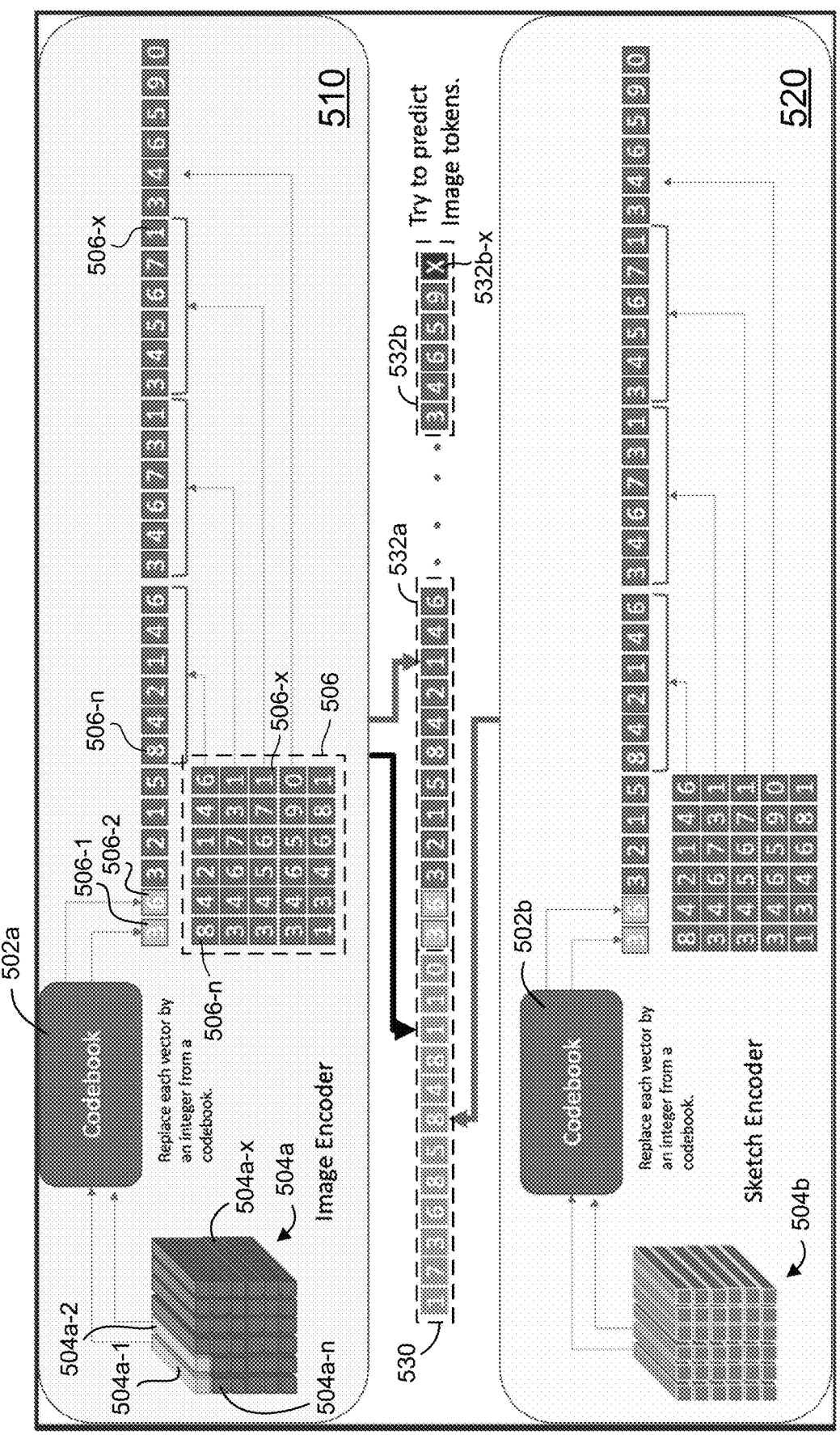
FIG. 5 is a diagram illustrating a process for training an image encoder in conjunction with a sketch encoder to predict image tokens, according to some embodiments.

FIG. 5 is a diagram illustrating a process for training an image encoder 510 in conjunction with a sketch encoder 520 to predict image tokens, according to some embodiments. In some embodiments, the image encoder 510 is an example of the encoder in the encoder-decoder architecture 400 of FIG. 4, and the sketch encoder 520 is an example of the encoder in the encoder-decoder architecture 400 of FIG. 4. Hence, two encoder-decoder pairs are present, one to be trained on sketches and one to be trained on images, which in some implementations are raster images (e.g., RGB images).

Figure 7A:
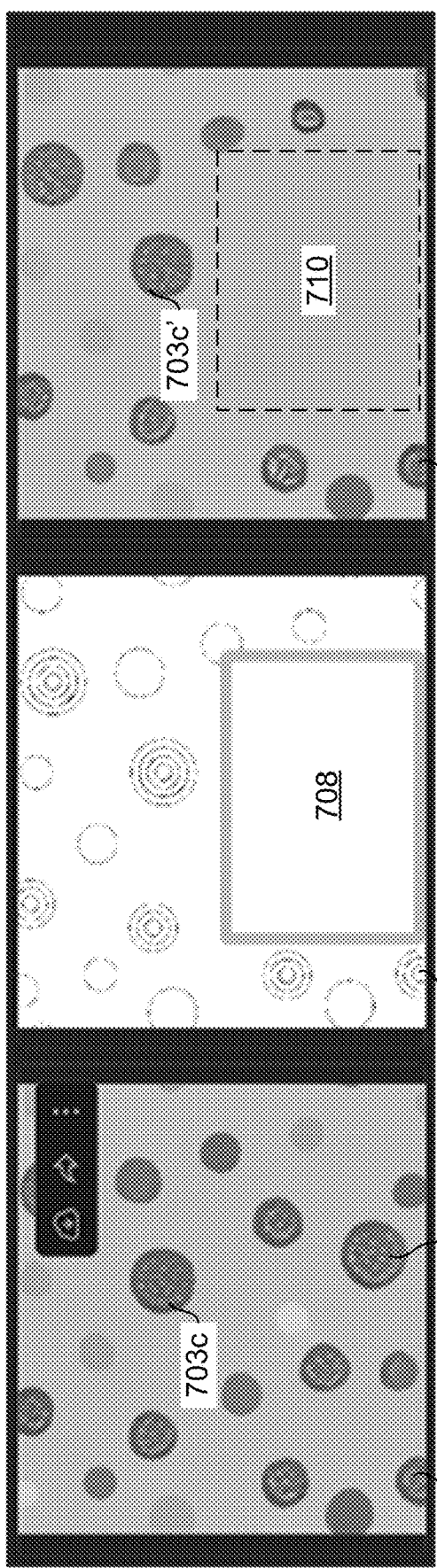
FIGS. 7A and 7B illustrate examples of an input image, a sketch image having a "copy space" modification applied, and a reconstructed image with the modification, according to some embodiments.

In some embodiments, two encoder models are trained. First, a first deep learning model of an image encoder (e.g., 510) is trained to encode input images (e.g., raster images such as RGB images) into a compressed image representation space, where each image representation distills part of the input image. Image 112 and images 202 are examples of the input image. An image representation can be one or more image tokens that represent the input image. In some implementations, the image encoder is trained on raster images (e.g., RGB images) collected from common keywords that display abstract background images, e.g., "abstract background with square patterns." In some examples, these input images include repetitive patterns, abstract features, or features that are not distinct objects. Image 702 shown in FIG. 7A is one such example of an image with repetitive and abstract patterns 703a, 703c, 703d having similar shapes. This type of image is often used as background images, over which text copy or other content can be placed, e.g., to give an aesthetic effect to the content.

In some implementations, the encoder is an autoencoder, which is an unsupervised learning technique that uses a neural network to find non-linear latent representations for a given data distribution. In some implementations, the autoencoder is a Vector Quantized Variational Autoencoder (VQVAE), which is configured to learn discrete (rather than continuous) latent representation of an image, such as aforementioned image tokens. These discrete image tokens are codes that can represent an image using an image representation obtained via encoding of the image, and be decoded back into the image (or a reconstruction of the image). In some implementations, the VQVAE is configured to compress the image into a quantized codebook. The codebook indices are used to predict subsequent image tokens based on existing image tokens, as will be discussed below.

Second, a second deep learning model of a sketch encoder (e.g., 520) is trained. In some embodiments, second autoencoder (e.g., VQVAE) model is trained on sketches of input images. Sketch image 110 and sketch images 200 are examples of the sketches of input images. As noted, in some embodiments, the sketches are generated by using a separate deep learning model that is trained to refine the edges of an image to sketch-like strokes.

In some embodiments, the image encoder 510 is configured to refer to a codebook 502a to encode an input image. As an aside, a "codebook" is a visual dictionary of a set of visual words (or codewords) that represent one or more feature vectors (e.g., at least feature vectors 504a, represented as a three-dimensional tensor that spans multiple parallel vector spaces of the same dimensionality) of one or more images. Put differently, the codebook is a mapping between a token and a learned vector representation (an embedding), the vector representation learned while training an encoder (e.g., 404, 510, 520) and a corresponding decoder (e.g., 408) to optimize for the best tokenized representations that reconstruct an image. A codebook can contain a list of vectors associated with a corresponding index. A codebook can also be used to quantize the bottleneck of the autoencoder, the bottleneck referring to the most compressed or most encoded version of the input image (representable by a layer between the encoder layers and the decoder layers), which can be subsequently decompressed or decoded into a reconstruction of the input image. Hence, the neural network consists of an encoder and a decoder (e.g., the encoder-decoder architecture 400).

The output of the encoder network can be compared to all the vectors in the codebook, and the codebook vector closest in Euclidean distance can be fed to an encoder, and may be mapped to a two-dimensional grid or array. Codebooks can be used to extract histogram-based features based on similarities between subsequences of the processed data and codewords. In some implementations, codebooks are implemented with a one-layer CNN that allows lower-resolution representation of larger data, e.g., by replacing a vector 504a-1 with a representative integer value such as a tokenized representation 506-1. In some implementations, a codebook is used in an unsupervised learning approach for determining representative subsequences. Codebook vectors can also be learned or trained via gradient descent with a loss function; the learned codebook vectors align to encoder outputs and vice versa. A subsequence of a given sequence is a sequence that can be derived from the given sequence without changing the order of the remaining elements. For example, a sequence of one or more tokenized representations is predicted by an image encoder or sketch encoder based on a given sequence of tokenized representations.

In some embodiments, a set of image tokens each having a unique integer value is obtained based on the codebook 502a for the image encoder 510 and the codebook 502b for the sketch encoder 520. For example, the image encoder 510 receives one or more feature vectors 504a (e.g., 504a-n . . . 504a-x) corresponding to one or more features of the input image (e.g., 112, 202, 402). A feature of the input image may be a line, a curve, a shape, a color, pixel values, pixel location, pixel coordinates, etc. The unique integer values correspond to image tokens predicted by the image encoder 510. Tokenized representations 406 of FIG. 4 may be examples of the unique integer values obtained by the image encoder 510, and similarly, unique integer values obtained by the sketch encoder 520.

In some implementations, the integer values are grouped into a data structure such as a matrix of values 506 corresponding to the set of feature vectors 504a. That is, in some scenarios, the vector 504a-1 corresponds to image token 506-1, the vector 504a-2 corresponds to image token 506-2, the vector 504a-n corresponds to image token 506-n, and the vector 504a-x corresponds to image token 506-x. Grouped into the matrix of values 506 are at least a portion of these image tokens 506-n, 506-x.

In some scenarios, the matrix of values 506 is passed to the corresponding decoder (not shown) of the image encoder 510. If the corresponding decoder is provided with a set of integer tokens 506 that follow a particular distribution, an image (e.g., a raster image, e.g., an RGB image) is obtained from the decoder. From here, the task now is to predict the tokens of the image encoder 510 taking clues from tokens from the sketch encoder 520.

In some embodiments, the sketch encoder 520 is configured to refer to a codebook 502b to encode an input sketch image, as shown in FIG. 5. The codebook 502b is a codebook that is independent of the codebook 502a used with the image encoder 510. In some embodiments, the sketch encoder 520 receives one or more feature vectors 504b corresponding to one or more edge features of the input sketch image (e.g., 110, 200). In some implementations, the one or more edge features include strokes or curves (e.g., rasterized curves, vectorized curves). Similar to the encoding performed with the image encoder 510, unique integer values are obtained by the sketch encoder 520. The unique integer values correspond to image tokens predicted by the image encoder 520.

In some embodiments, the unique integer values obtained from the image encoder 510 and the sketch encoder 520 are generated as image tokens 530. These represent features in the input image and the input sketch image. The input sketch image guides the representation of edge features in the input image.

During training of the image encoder 510, the image encoder 510 generates one or more subsequent image tokens 532a based on the image tokens 530. That is, the image tokens 530 provide context for the encoding desired features into the one or more subsequent image tokens 532a. However, if the preceding image tokens 530 are different (representing a different image feature), the one or more subsequent image tokens 532a would also be different. As will be discussed below, if a user desires production of, for example, a different color (e.g., red) or a lack of a feature, subsequent image tokens can be predicted assuming that such desired attributes exist. In other words, the subsequent image tokens allow a downstream transformer model to "hallucinate" the existence of the desired attributes.

In some cases, the image encoder 510 additionally generates one or more subsequent image tokens 532b. More broadly, the image encoder 510 attempts to predict the one or more subsequent image tokens 532a and 532b based on the image tokens 530 that exists from previous encoding. The additional one or more subsequent image tokens 532b are generated based on a concatenation of the image tokens 530 and the one or more subsequent image tokens 532a. The one or more subsequent image tokens 532a and 532b are predicted one value at a time. In FIG. 5, the image token 532b-x labeled "X" is the image token to be predicted after the image token labeled "9" preceding it. Once the prediction of image token 532b-x is generated, the image encoder 510 may continue to generate one or more image tokens thereafter.

In some embodiments, the resulting one or more subsequent image tokens 532a and 532b are compared against a training example, which results in ground truth image tokens upon encode. In some implementations, an error may be determined based on image tokens generated by a perceivable version of the hallucinated image. For example, a trainer provides to the image encoder 510 a training image that has a blank rectangle at a given coordinate of the image, and to the sketch encoder 520 a sketch version of the training image. The image encoder 510 and the sketch encoder 520 generates training image tokens based on encoding of the training image and the sketch version of the training image. The resulting image tokens are compared to the predicted one or more subsequent image tokens 532*a* and 532*b*.

In some implementations, a loss function determines a difference or an error between the training image tokens (expected output) and the predicted one or more subsequent image tokens 532*a* and 532*b* (network output), and alters one or more weights or training parameters associated with one or more encoder layers of the image encoder 510 and/or the sketch encoder 520 in an attempt to reduce the error. Another set of training examples is fed to the image encoder 510 and the sketch encoder 520 to reduce the error until a minimum is determined (e.g., using gradient descent).

Figure 6:
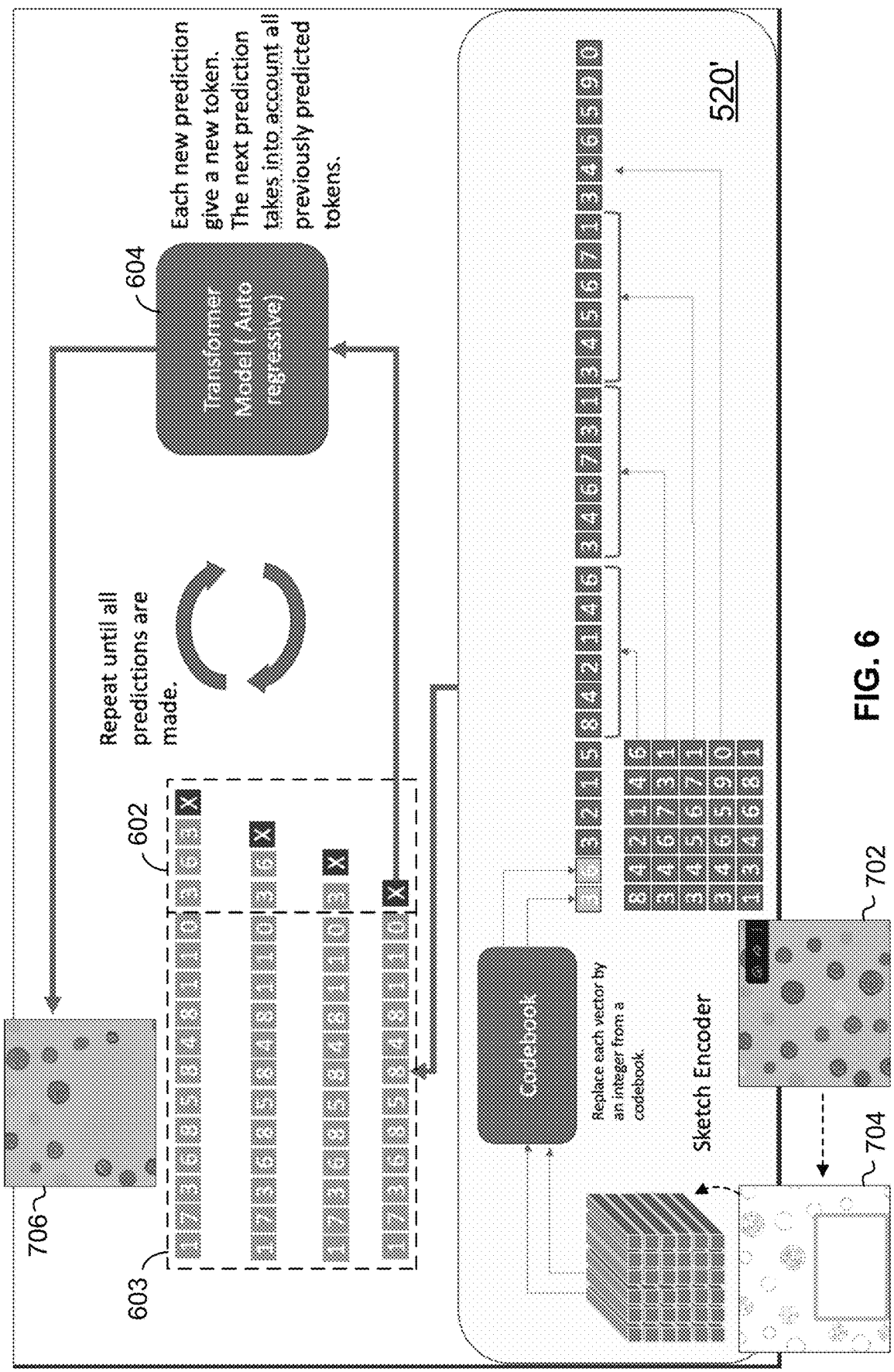
FIG. 6 is a diagram illustrating a process for inferring image tokens with a trained sketch encoder, according to some embodiments.

Refer now to FIG. 6, which is a diagram illustrating a process for inferring and predicting image tokens with a trained sketch encoder 520' trained according to the approach described in FIG. 5, according to some embodiments. In some scenarios during inference, the trained sketch encoder 520' predicts image token predictions 602 subsequent to previously predicted tokens 603, one at a time, taking into account all of the previously predicted tokens 603, based on a sketch version of an input image (e.g., sketch image 704 of an input image 702). In some scenarios, the previously predicted tokens 603 are (i) generated by a trained image encoder (representing the input image) and/or the trained sketch encoder (representing the sketch image), and (ii) concatenated into a prescribed sequence into the previously predicted tokens 603.

In some embodiments, the predicted image token predictions 602 represent a "hallucinated" version of an input image. For example, a user may desire an image that is identical to the input image, except that some of the patterns contained therein are in different colors. As another example, the user may desire an image that is identical to the input image, except that there is a blank space lacking features that is at given coordinates, or some portions are blurred out. The image token predictions 602 are produced assuming that such desired features or attributes exist in this hallucinated image. Thus, the image token predictions 602 may represent an image that is missing lines or curves where there is a blank space, for example (see, e.g., reconstructed images 706 and 718 in FIGS. 7A and 7B). In some embodiments, a downstream transformer model 604 reconstructs the hallucinated image having the desired attributes. Each prediction produces a new token sequentially, and as alluded to above, taking into account all previously predicted tokens (i.e., autoregressively). In FIG. 6, the image token predictions 602 based on previously predicted tokens are shown as image tokens "3," "6," and then "3."

One difference between training as depicted in FIG. 5 and inference as depicted in FIG. 6 is that the one or more subsequent image tokens 532*a* and 532*b* are not predicted for training. Rather, each image token prediction 602 is fed to the transformer model 604, which may be an example of the transformer model 106. In some embodiments, image token predictions 602 are fed to the transformer model 604 after all the image tokens are generated (until the prediction process is stopped according to the specific number of image tokens below). However, in some cases, image token predictions 602 are fed to the transformer model in smaller subsets or groups. That is, in one example, image tokens are fed to the transformer model 604 in groups of 6 or 12 or other numbers. The transformer model 604 is configured to generate a reconstructed image 706 based on the received image token predictions 602. In some implementations, the transformer model 604 predicts the probabilities of pixel values at each pixel, as discussed with respect to FIG. 1, to determine the pixel values of the reconstructed image 706.

In some embodiments, a specific number of image tokens are predicted before stopping prediction, where the number of image tokens is a predetermined quantity proportional to the size of the input image or the size of the canvas on which the predicted image is being generated. For example, for a 256×256-sized input image, the number of predicted image tokens is 16×16. Other numbers (e.g., 32×32) may be considered depending on, e.g., capability of the transformer model 604.

After the correct number of image tokens for the image encoder 510 (determined by the specific number above), the prediction process is stopped. In some embodiments, the transformer model 604 is configured to form a token grid (which may be an example of the matrix of values 506 shown in FIG. 5) and pass the token grid through a decoder corresponding to the image encoder 510. In some implementations, the transformer model 604 causes the decoder (e.g., decoder 408) to generate the reconstructed image 706 based on, e.g., the determined pixel values of the reconstructed image 706.

Since all predictions are made by conditioning on tokens from the trained sketch encoder 520', modifications to those will induce a change in the predicted image token predictions 602. Advantageously, this allows high-resolution images to be reconstructed based on the aforementioned hallucinations that include modifications, e.g., to the sketch version of the input image. Example implementations of these modifications are discussed below.

Example Implementations

FIG. 7A illustrates an example of an input image 702, a sketch image 704 having a "copy space" modification applied, and a reconstructed image 706 with the modification, according to some embodiments. In this example, the input image 702 is an image with various patterns, such as a patterns 703*a*, 703*c*, 703*d*. In some cases, the input image 702 could be used as a background image. The sketch image 704 is a sketch version of the input image 702 and includes edge features corresponding to various patterns in the input image 702, such as a pattern 703*b* that matches the pattern 703*a*. In some scenarios, a user selects or assigns an area corresponding to a blank area 708 on the sketch image 704, where the blank area 708 is a rectangle drawn or identified via coordinates, to be used as, e.g., a copy space that can hold text without visually interfering with the patterns in the input image 702. In some implementations, the blank area 708 is an area conditionally filled with null image data, a single pixel value (e.g., corresponding to white), or no image data.

In some embodiments, according to the training and/or inference process described with respect to FIGS. 5 and/or 6, by providing the input image 702 to a trained image encoder, and providing the sketch image 704 having the modification (blank area 708) to a trained sketch encoder, image tokens are autoregressively predicted. A version of the input image 702 with the modification (without any patterns in the area corresponding to the blank area 708 of the sketch image 704) is "hallucinated" by a transformer model (e.g., 604) based on the predicted image tokens. The reconstructed image 706 is generated based on the "hallucination." The reconstructed image includes a modified area 710 corresponding to (e.g., at the location or coordinates of) the blank area 708. The modified area 710 is free of features (such as feature 703*d*) but retains attributes or the style of the input image 702, e.g., a color similar to portions of the input image 702, and/or features 703*a*, 703*c* (reconstructed as features 703*a'*, 703*c'* in the reconstructed image 706). In some applications, the modified area 710 is a copy space can include text or other content (e.g., another background image) without the clutter.

Figure 7B:
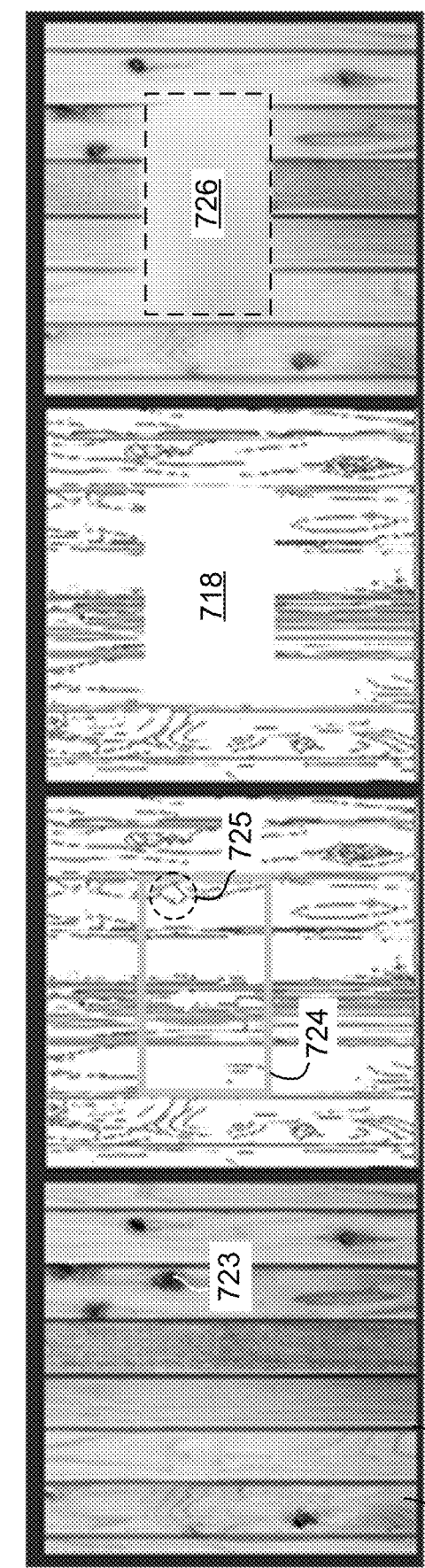

FIG. 7B illustrates another example of an input image 712, a sketch image 716 having a "copy space" modification applied, and a reconstructed image 720 with the modification, according to some embodiments. In this example, the input image 712 is an image with various defined features, such as vertical wooden planks 721, spaces 722 between the planks, and knots 723 on some of the planks. In some cases, the input image 712 could be used as a background image.

A sketch image 714 is a sketch version of the input image 712. In some implementations, boundaries of an area are defined by a rectangle 724 over the sketch image 714. In some implementations, a user draws the boundaries. In some implementations, the user provides coordinates of corners, coordinate of pixels of the boundaries, vector information of boundaries, or dimensions, size, number of pixels, etc. associated with the boundaries. In some implementations, the boundaries are in any other shape, e.g., circle, triangle, parallelogram, star, freeform shape, which may be defined using coordinates, dimensions, etc. as noted above. The sketch image 714 includes various edge features corresponding to features (e.g., 721-723) of the input image 712. For example, edge feature 725 corresponds to the knot 723 in the input image 712. Various vertical lines and grain textures matching the corresponding features of the input image 712 are also shown in FIG. 7B. The boundaries of the area in sketch image 714 correspond to a blank area 718 on the sketch image 716. In some implementations, the blank area 718 is an area conditionally filled with null image data, a single pixel value (e.g., corresponding to white), or no image data.

In some embodiments, boundaries such as the rectangle 724 can be edited or modified spatially within the sketch image 714. The conditional filling of the blank area 718 ensures that only the required regions of the image (e.g., rectangle 714) are modified while keeping the rest of the sketch image 714 constant.

In some embodiments, according to the training and/or inference process described with respect to FIGS. 5 and/or 6, by providing the input image 712 to a trained image encoder, and providing the sketch image 716 (including the blank area 718) to a trained sketch encoder, image tokens are autoregressively predicted. A version of the input image 712 with the modification (without any patterns in the area corresponding to the blank area 718 of the sketch image 716) is "hallucinated" by a transformer model (e.g., 604) based on the predicted image tokens. The reconstructed image 720 is generated based on the "hallucination." In this example, the reconstructed image 720 includes a modified area 726 corresponding to the blank area 718. The modified area 726 is free of features (such as 721-723) but retains attributes or the style of the input image 712, e.g., a color similar to portions of the input image 712. In some applications, the modified area 726 is a copy space can include text or other content (e.g., another background image) without the clutter.

Figure 8:
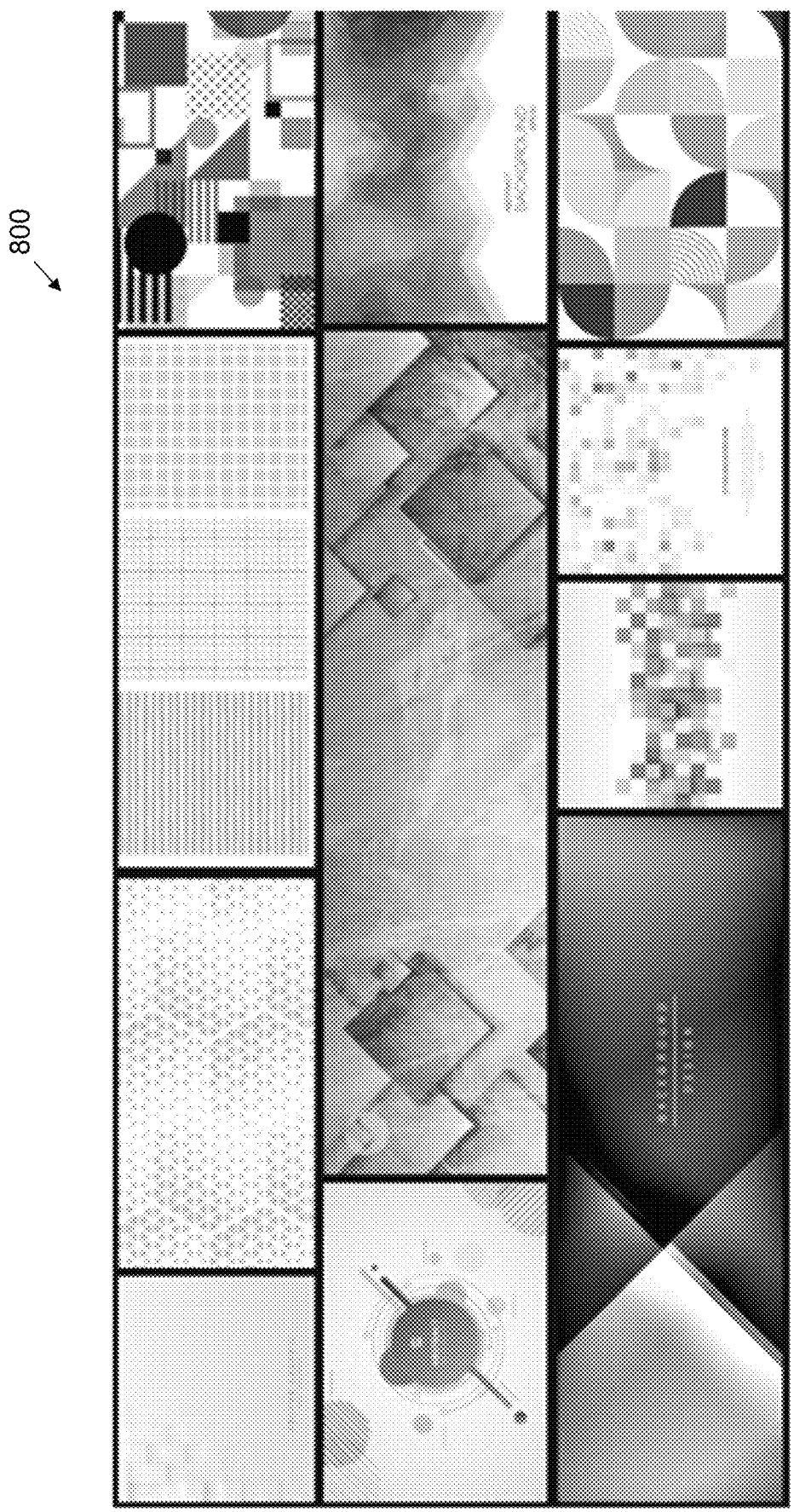
FIG. 8 illustrates various examples of background images, each of which may be used as an input image, for example in relation to examples of FIG. 7.

FIG. 8 illustrates various examples of background images 800, each of which may be used as an input image, for example in relation to examples of FIG. 7. In some scenarios, the input image 702 and the input image 712 may each be an example of one of the background images 800. In some scenarios, each of the background images 800 can be used as an input image that can be used as a basis for a corresponding sketch image, which is useful for, e.g., applying modifications and/or conditioning a transformer model as discussed above and below.

FIG. 9A is an example of a conversion of a user-generated sketch image 902 to various novel background images 904*a*-*c*, according to some embodiments. In some embodiments, multiple samplings of the sketch image 902 using a transformer model (e.g., 106, 604) allow generation of diverse background images (e.g., 904*a*-*c*) having different attributes such as color, hue, tint, shading, or other color attributes or image attributes (lightness, saturation, etc.), while maintaining boundaries corresponding to edge features 903*a*-*d* associated with the sketch image 902.

In some embodiments, an image of a drawing can be obtained, e.g., the sketch image 902, which in some cases, is a drawing generated by a user (e.g., drawn on a canvas with a touchscreen interface), or an example of a sketch image generated based on another input image (e.g., sketch images 200 generated based on images 202). In some embodiments, according to, e.g., the approach described above with respect to FIGS. 5 and 6, the transformer model is configured to apply a desired attribute (e.g., a color attribute, an image attribute, empty or blank regions) within one or more regions in the sketch image while maintaining the overall style. The "style" can be said to be maintained if, e.g., the boundaries defined by edge features of the sketch image provided are maintained and present in modified versions of the sketch image. In some implementations, locations of the regions are defined by capturing the locations (e.g., coordinates) of the sketch image corresponding to locations the canvas was touched by the user. For example, a touch pen or stylus can provide signals forming user input on a touchscreen, or a mouse can provide user input on a display screen. This allows the user to edit images and boundaries interactively by stroking on regions of the canvas, e.g., on a sketch image within the canvas. The transformer model is used to implement one or more modifications to the regions and thereby create novel structures (e.g., background images 904*a*-*c*) grounded in the style of the sketch image 902. In some implementations, existing edge features or boundaries in the sketch image can be shifted in location or erased, or new ones can be drawn in the sketch image, after the novel structures have been created. In such cases, additional samples of the sketch image can be taken to regenerate the novel structures based on the latest sketch image.

As an example of a novel structure, novel background image 904*a* includes different amounts of shading within different boundaries defined by the edge features 903*a*-*d*. The shading within a region having boundaries defined by edge features 903*b* and 903*c* is darker compared to, e.g., a region having boundaries defined by edge features 903*c* and 903*d*. As another example, background image 904*b* includes different colors within different boundaries defined by the edge features 903*a*-*d*. The region having boundaries defined by edge features 903*b* and 903*c* has a lighter color than, e.g., a region having boundaries defined by edge features 903*c* and 903*d*. As another example, background image 904*c* also includes different colors within different boundaries defined by the edge features 903*a*-*d*. The region having boundaries defined by edge features 903*b* and 903*c* has a different hue than, e.g., a region having boundaries defined by edge features 903*c* and 903*d*.

FIG. 9B is another example of a conversion of a user-generated sketch image 912 to various novel background images 914*a-c*, according to some embodiments. Similar to the examples shown in FIG. 9A, novel background images 914*a-c* can be generated by a transformer model that takes multiple samples of the sketch image 912.

Figure 10:
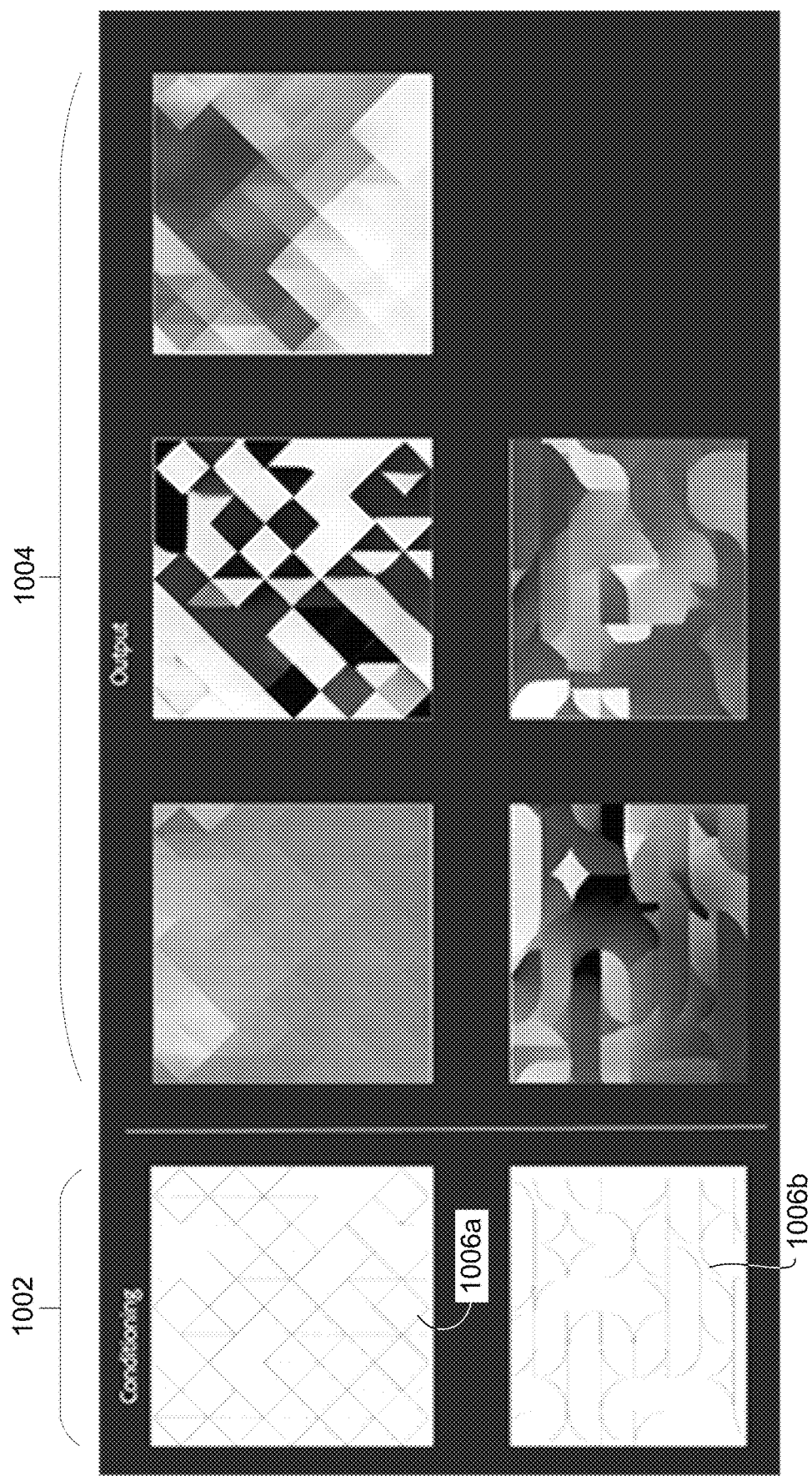

FIG. 10 illustrates additional examples of conversions of sketch images 1002 into various novel images 1004, according to some embodiments. In some embodiments, the sketch images 1002 are user generated, e.g., drawn on a canvas using a pen or stylus, or generated based on an input image. In some embodiments, a transformer model is conditioned on sketch images 1002, including edge features of the sketch images 1002, according to, e.g., the approach described above with respect to FIG. 6. Example edge features 1006*a* and 1006*b* are shown as lines or curves making up the sketch images 1002. It can be seen that novel images 1004 possess image attributes that vary from one another. However, since the transformer model has been conditioned on the sketch images 1002, the structure and style (e.g., lines and curves of edge features) are maintained.

Figure 11A:
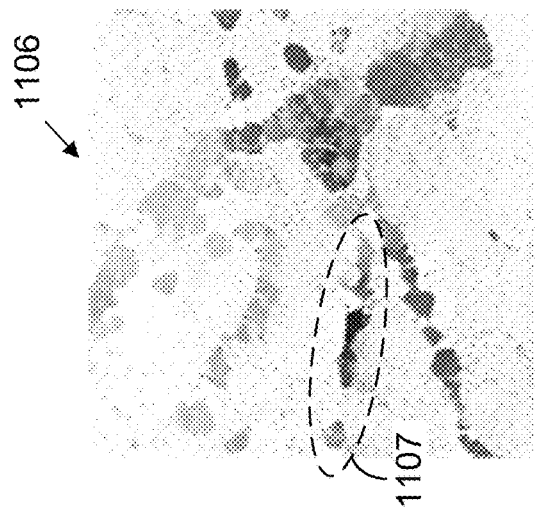
FIGS. 11A and 11B illustrate examples of an edit made to an input image using a user drawing as a sketch image to generate a novel reconstructed image having features from the sketch image, according to some embodiments.
Figure 11A:
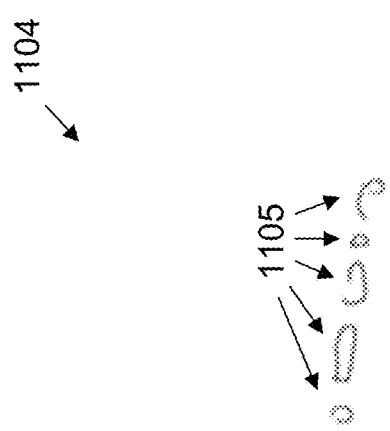
Figure 11A:
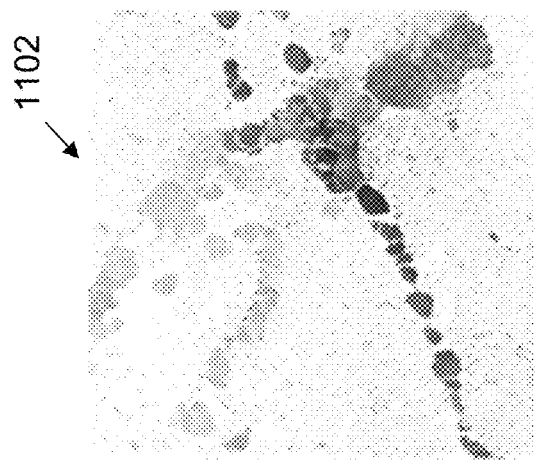

FIG. 11A illustrates an example of an edit made to an input image 1102 using a user drawing as a sketch image 1104 to generate a novel reconstructed image 1106 having features from the sketch image 1104, according to some embodiments. In some embodiments, the sketch image 1104 is drawn on a canvas (e.g., a drawing area on, e.g., a user application or a user interface that can accept user input). In some examples, five irregular shapes 1105 resembling circles and ovals are drawn by a user and received as a user input by the user interface. The sketch image 1104 is obtained based on the drawings of the shapes 1105.

In some embodiments, the input image 1102 is provided to a trained image encoder, and the sketch image 1104 is provided to a trained sketch encoder. In some implementations, image tokens are autoregressively predicted by the trained image encoder and the trained sketch encoder, and concatenated together. In some implementations, the trained sketch encoder can further predict additional image tokens based on the concatenated predicted image tokens. Since a transformer model can be used to predict tokens one location at a time in the reconstructed image 1106, a user can interactively edit or update the image by, e.g., drawing the irregular shapes 1105 on the canvas and providing the sketch image 1104 with the irregular shapes 1105; and the transformer model can edit the regions in the input image 1102 corresponding to the locations of the irregular shapes 1105 to match the provided sketch image 1104 while maintaining the overall style of the input image 1102 (e.g., keeping the features of the input image 1102). In some implementations, the edit locations are defined by capturing the locations where the canvas was touched or drawn on by the user. In some embodiments, the image tokens predicted by the sketch encoder are used by the transformer model to "hallucinate" an image having the edge features of the provided sketch image 1104. The transformer model can then create novel structures 1107 in the reconstructed image 1106. The reconstructed image 1106 is a version of the input image 1102 with novel structures 1107, which are additional features grounded in the style of the input image 1102. In some implementations, the novel structures 1107 correspond to the irregular shapes 1105 and are in the style of the input image 1102; e.g., the novel structures 1107 have attributes (e.g., colors and gradients) similar to some of the other features of the input image 1102.

The edge features in sketch image 1104 define the detail and quality of the output reconstructed image 1106 and novel structures 107. The prediction of image tokens described herein allow image resolutions to be scaled up or down, e.g., by using more or fewer of the predictions of the image tokens. In different applications, the number of predicted image tokens is 16×16, 32×32, etc. In some implementations, for more intricate patterns or edge features, the transformer model is configured to increase the resolution of the reconstructed image 1106, which results in the intricate patterns being created without loss of fidelity and at high efficiency.

Figure 11B:
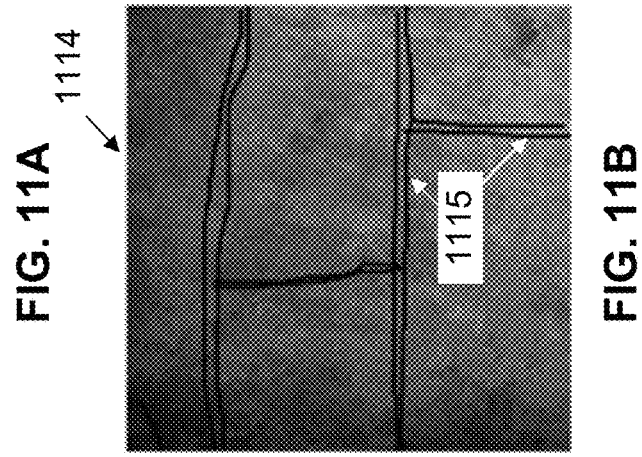
Figure 11B:
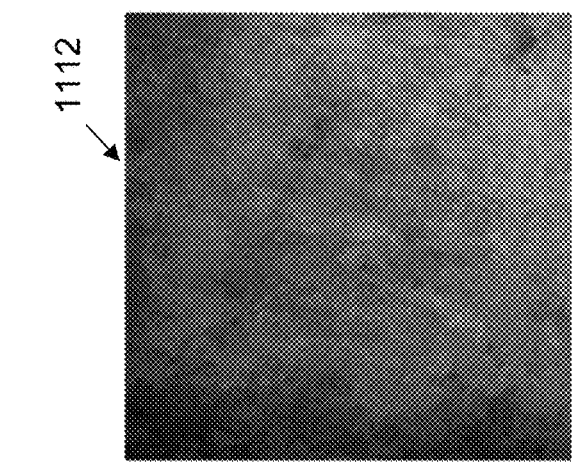

FIG. 11B illustrates another example of an edit made to an input image 1112 using a user drawing as a sketch image 1114 to generate a novel reconstructed image 1116 having features from the sketch image 1104, according to some embodiments. In some embodiments, the sketch image 1114 includes sketched lines 1115 drawn over the input image 1112. Similar to the example of FIG. 11A, the sketched lines 1115 are provided by a user using, e.g., a user application or a user interface that can accept user input. In some cases, the sketched lines 1115 are drawn over a blank canvas. In some embodiments, the input image 1112 is provided to a trained image encoder, and the sketch image 1114 is provided to a trained sketch encoder to autoregressively predict respective image tokens, which are concatenated together. In some implementations, the trained sketch encoder can further predict additional image tokens based on the concatenated predicted image tokens.

In some embodiments, a transformer model is used to predict tokens one location at a time in the reconstructed image 1116. Hence, the transformer model can edit the regions in the input image 1112 corresponding to the locations of the sketched lines 1115 to match the provided sketch image 1114 while maintaining the overall style of the input image 1112. The image tokens predicted by the sketch encoder are used by the transformer model to "hallucinate" an image having the edge features of the provided sketch image 1114. The transformer model can then create novel structures 1117 as part of the reconstructed image 1116. The reconstructed image 1116 is a version of the input image 1112 with novel structures 1117, which are additional features grounded in the style of the input image 1112. In some implementations, the novel structures 1107 correspond to the sketched lines 1115 and are in the style of the input image 1102; e.g., the novel structures 1117 have attributes (e.g., colors and textures) similar to some of the other features of the input image 1112. In some implementations, image tokens for additional desired attributes (e.g., a different color than present in the input image 1112) can be predicted; such image tokens allow the transformer model to hallucinate the desired attributes.

Methods

Figure 12:
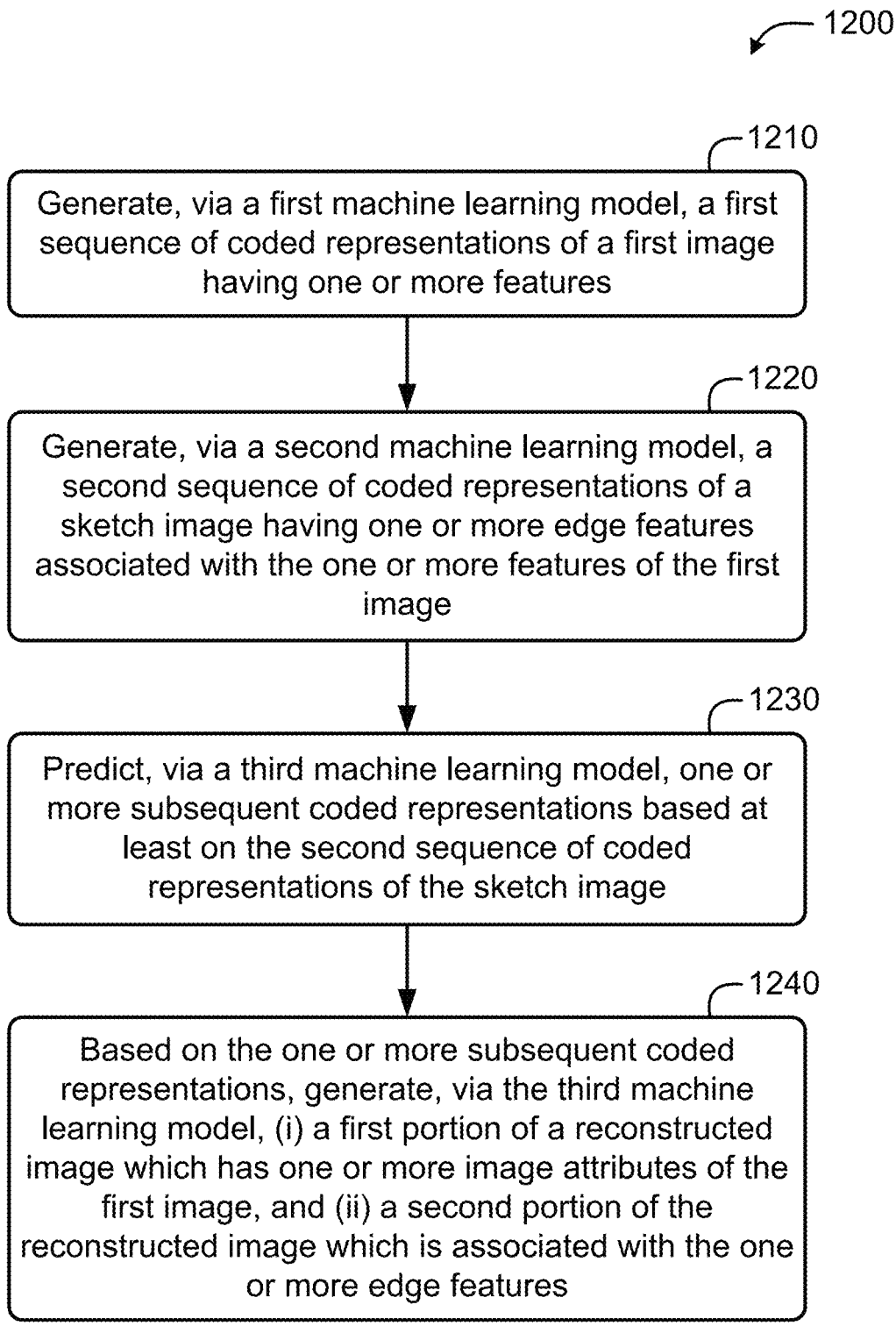
FIG. 12 is a flow diagram of a method for generating a novel image, in accordance with some embodiments.
Figure 15:
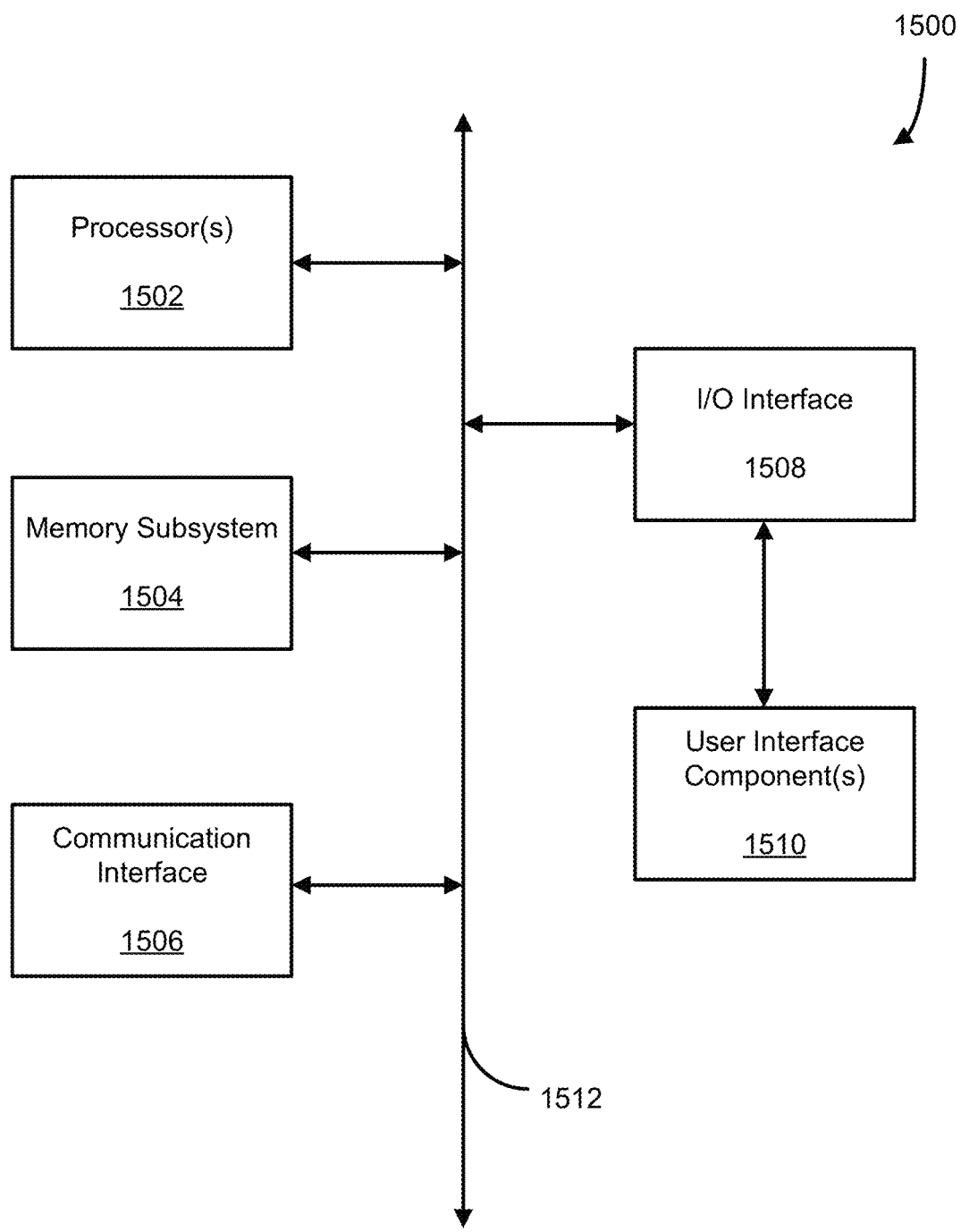
FIG. 15 shows a schematic diagram of an example computing device for implementing the methods, systems, and techniques described herein in accordance with some embodiments.

FIG. 12 is a flow diagram of a method 1200 for generating a novel image, in accordance with some embodiments. In some embodiments, the functionality illustrated in one or more of the blocks shown in FIG. 12 is performed by hardware and/or software components of a suitable computerized system or apparatus, e.g., a user device (mobile or otherwise), a workstation, a server. In some implementations, the computerized system or apparatus is configured to operate the various components and modules implementing at least portions of the architectures of FIGS. 1, 4, 5 and/or 6. In some aspects, a computer-readable apparatus including a storage medium stores computer-readable and computer-executable instructions that are configured to, when executed by at least one processor apparatus, cause the at least one processor apparatus or another apparatus (e.g., the computerized apparatus) to perform the operations of the method 1200. Example components of the computerized apparatus are illustrated in FIG. 15, which are described in more detail below.

It also should be noted that the operations of the method 1200 may be performed in a different suitable order, not necessarily the order depicted in FIG. 12. In some embodiments, at least some portions of the blocks may be performed substantially concurrently. Further, the method 1200 may include additional or fewer operations than those depicted in FIG. 12 to accomplish the image generation.

At block 1210, the method 1200 includes generating, via a first machine learning model, a first sequence of coded representations of a first image having one or more features. In some embodiments, an image encoder implements the first machine learning model. The image encoder is configured to receive the first image as an input. Images 112, 202, 702, 712 and 800 are examples of the first image. In some embodiments, the first machine learning model is a first CNN implemented by the image encoder. Image encoder model 104 and image encoder 510 are examples of the image encoder. In some embodiments, the coded representations of the first image are integer values in a particular sequence that represent the one or more features. Image tokens 506-1 through 506-x, 530, 532a, 532b are a few examples of the first sequence of coded representations of the first image. Regions 206a, patterns 703a, 703c, 703d, and features 721-723 are examples of the one or more features of the first image.

In some implementations, the first CNN generates the first sequence of coded representations using convolution of the first image with a kernel, e.g., as described with respect to FIG. 3. Such convolution encodes or compresses values associated with the first image, such as a matrix of pixel values (e.g., pixel values 304), into a smaller, downsized matrix of values (e.g., the feature map 306). In some cases, the smaller matrix is further downsized one or more times using convolution via the first CNN.

In some embodiments, the image encoder is an autoencoder (e.g., VQVAE) trained to encode input images (e.g., raster images such as RGB images) into a compressed image representation space, where each image representation distills part of the input image. Image 112 and images 202 are examples of the input images. In some implementations, the image encoder is trained on raster images (e.g., RGB images) collected from common keywords that display abstract background images, e.g., "abstract background with square patterns." In some examples, these input images include repetitive patterns, abstract features, or features that are not distinct objects, e.g., images 702, 712.

At block 1220, the method 1200 includes generating, via a second machine learning model, a second sequence of coded representations of a sketch image having one or more edge features associated with the one or more features of the first image. In some embodiments, a sketch encoder implements the second machine learning model. The sketch encoder is a type of image encoder that is configured to receive the sketch image as an input. Sketch images 110, 200, 704, 714, 716, 902, 912 and 1002 are examples of the sketch image. In some embodiments, the second machine learning model is a second CNN implemented by the sketch encoder. Sketch encoder model 102 and sketch encoder 520 are examples of the sketch encoder. In some embodiments, the second sequence of coded representations of the sketch image are integer values in a particular sequence that represent the one or more edge features associated with the one or more features of the first image. Sketch-like strokes 210a and 210b, pattern 703b that matches the pattern 703a, edge features 903a-d, and edge features 1006a and 1006b are examples of the one or more edge features associated with the one or more features of the first image.

In some implementations, the second CNN generates the second sequence of coded representations using convolution of the sketch image with a kernel, e.g., as described with respect to FIG. 3. Such convolution encodes or compresses values associated with the sketch image, which are also a matrix of pixel values, into a smaller, downsized matrix of values. In some cases, the smaller matrix is further downsized one or more times using convolution via the first CNN.

In some embodiments, the sketch encoder is another autoencoder (e.g., VQVAE) trained to encode sketches of input images. Sketch image 110 and sketch images 200 are examples of the sketches of input images.

As discussed elsewhere herein and will be discussed below, the sketch image can be edited or otherwise manipulated by a user to overcome challenges in the existing art in that it can dynamically and flexibly create novel images grounded in the style of the input image (e.g., the first image) based on "hallucinations" of a transformer model without having to make modifications directly to a static image.

At block 1230, the method 1200 includes predicting, via a third machine learning model, one or more subsequent coded representations based at least on the second sequence of coded representations of the sketch image. In some implementations, the predicting is based on the first sequence of coded representations and of the first image and the second sequence of coded representations of the sketch image. In some embodiments, the third machine learning model includes a transformer model. Transformer models 106 and 604 are examples of the transformer model. Taking into account the second sequence of coded representations representing the sketch image as context (including the edge features associated with the one or more features of the first image), the one or more subsequent coded representations are generated. The one or more subsequent coded representations represent "hallucinated" image features that will be included in a reconstructed image. In some embodiments, a concatenation of the first and second sequences of coded representations are taken into account when predicting the one or more subsequent coded representations.

At block 1240, the method 1200 includes, based on the one or more subsequent coded representations, generating, via the third machine learning model, at least (i) a first portion of a reconstructed image which has one or more image attributes of the first image, and (ii) a second portion of the reconstructed image which is associated with the one or more edge features. In some embodiments, the first portion of the reconstructed image includes image features having the style or attributes of the first image. For example, same or similar features as those of the first image are included in the reconstructed image, such as features 703a', 703c' corresponding to features 703a, 703c in FIG. 7A. Other examples are shown in FIGS. 7B, 9A, 9B and 10, where, for example, edge features 1006a and 1006b are lines and curves retained in the novel images 1004 in FIG. 10. The second portion includes a "hallucination" by the transformer model, and is associated with the one or more edge features. For example, new features in the style of the first image are added in the reconstructed image, or a copy space in the shape of a blank area in the sketch image is added as a blank region in the reconstructed image, or various color schemes within regions defined by boundaries in the sketch image are introduced in different novel background images.

In some embodiments, the reconstructed image includes features having other image attributes that are different from the image attributes of the first image, or did not exist in the first image. For example, the structures defined by the features of the first portion can have different colors filled within regions defined by boundaries created by the edge features of the sketch image. FIGS. 9A and 9B illustrate various examples of novel background images that maintain boundaries present in the first image and the sketch image but with different color or image attributes (e.g., color schemes, shading, saturation), where the novel background images are generated by the transformer model that takes multiple samples of a user-drawn sketch image. Sketch images generated based on an input image can also be used to generate novel background images grounded in the style of the input image. As another example, a copy space can be created within an image based on a sketch image with an empty region, where the copy space is a blank area (e.g., a rectangle) corresponding to the empty region which does not include features originally present in the first image.

In some embodiments, to create a reconstructed image having a copy space, the method 1200 further includes obtaining an indication of a blank space within the reconstructed image, wherein the second sequence of coded representations comprise coded representations associated with the blank space, and based on the one or more subsequent coded representations, generating, via the third machine learning model, a featureless portion of the reconstructed image comprising the blank space without the one or more features, the second portion of the reconstructed image comprising the featureless portion. See, e.g., FIGS. 7A and 7B.

In some embodiments, to convert a user-drawn sketch image to a novel background image, the first portion of the reconstructed image comprises the one or more edge features associated with the one or more features of the first image, and the second portion of the reconstructed image comprises one or more modified image attributes and different from the one or more image attributes of the first image, one or more modified image attributes comprising an alteration to at least a color of the one or more features. See, e.g., 9A, 9B and 10.

In some embodiments, to generate novel background images, the implementing of the third trained machine learning model further includes obtaining one or more new features based on a second sketch image. In some implementations, the obtaining of the one or more new features includes outputting one or more new coded representations subsequent to the predicted one or more subsequent coded representations based on a sequence of coded representations of the second sketch image, and generating the one or more new features based on the one or more second tokens. Here, the second portion of the reconstructed image includes the one or more new features, and the reconstructed image comprises the one or more features and the one or more new features. See, e.g., FIGS. 11A and 11B.

Figure 13:
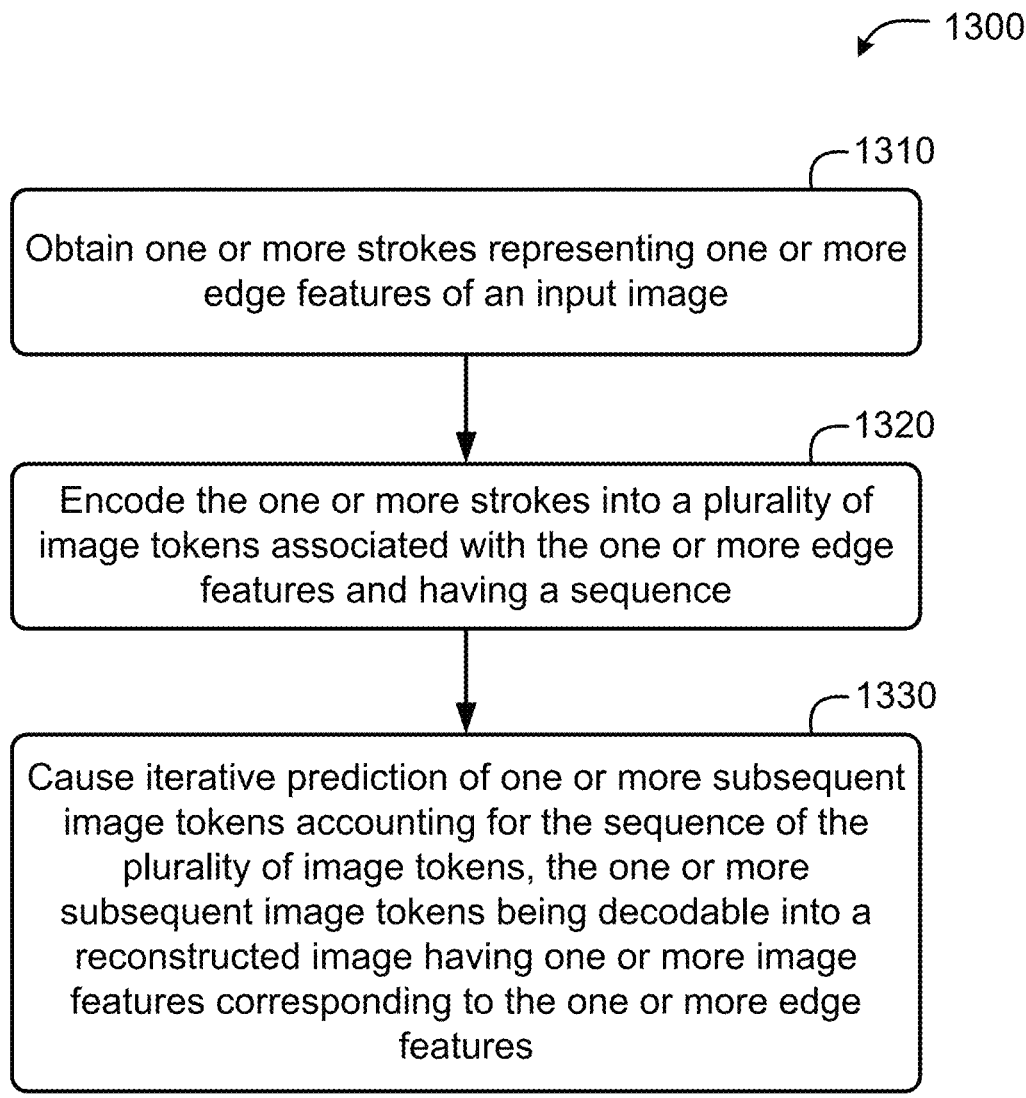
FIG. 13 is a flow diagram of another method for generating a novel image, in accordance with some embodiments.

FIG. 13 is a flow diagram of another method 1300 for generating a novel image, in accordance with some embodiments. In some embodiments, the functionality illustrated in one or more of the blocks shown in FIG. 13 is performed by hardware and/or software components of a suitable computerized system or apparatus, e.g., a user device (mobile or otherwise), a workstation, a server. In some implementations, the computerized system or apparatus is configured to operate the various components and modules implementing at least portions of the architectures of FIGS. 1, 4, 5 and/or 6. In some aspects, a computer-readable apparatus including a storage medium stores computer-readable and computer-executable instructions that are configured to, when executed by at least one processor apparatus, cause the at least one processor apparatus or another apparatus (e.g., the computerized apparatus) to perform the operations of the method 1300. In some embodiments, a machine learning model implemented by an image encoder performs the operations of the method 1300. Example components of the computerized apparatus are illustrated in FIG. 15, which are described in more detail below.

It also should be noted that the operations of the method 1300 may be performed in a different suitable order, not necessarily the order depicted in FIG. 13. In some embodiments, at least some portions of the blocks may be performed substantially concurrently. Further, the method 1300 may include additional or fewer operations than those depicted in FIG. 13 to accomplish the image generation.

At block 1310, the method 1300 includes obtaining one or more strokes representing one or more edge features of an input image. In some embodiments, the one or more strokes are lines and/or curves that define boundaries corresponding to structures in another image. Sketch-like strokes 210a and 210b, pattern 703b that matches the pattern 703a, edge features 903a-d, and edge features 1006a and 1006b are examples of the one or more strokes.

At block 1320, the method 1300 includes encoding the one or more strokes into a plurality of image tokens associated with the one or more edge features and having a sequence. In some embodiments, a sketch encoder utilizes a CNN to generate the plurality of image tokens using. That is, convolution of a sketch image that contains the one or more strokes is performed to obtain a particular sequence or an array of image tokens representative of the one or more strokes. In some scenarios, the image tokens are a downsampled version of the sketch image. Image token predictions 602 are examples of the plurality of image tokens. That is, the plurality of image tokens are generated during inference of a trained sketch encoder.

At block 1330, the method 1300 includes causing iterative prediction of one or more subsequent image tokens accounting for the sequence of the plurality of image tokens, the one or more subsequent image tokens being decodable into a reconstructed image having one or more image features corresponding to the one or more edge features. In some embodiments, the reconstructed image includes new features not present in the input image, where the new features correspond to the one or more edge features. For example, the reconstructed image and the new features are generated by the transformer model taking into account all of the previously generated plurality of image tokens. The transformer model is configured to predict tokens one location at a time in the reconstructed image.

In some embodiments, a transformer model configured to predict image tokens using language modeling is used to perform the iterative prediction of one or more subsequent image tokens accounting for the sequence of the plurality of image tokens.

In some embodiments, the machine learning model has been trained by obtaining a first training image tokens and a second training image tokens, the first training image tokens generated by the machine learning model, the second training image tokens generated by another machine learning model, the another machine learning model configured to encode one or more (non-edge) features of the image, generating a prediction of an image token of a pixel based on the first and second training image tokens, and performing an optimization process based on the predicted image tokens and a ground truth. In some implementations, gradient descent as noted above is used as the optimization process. In some implementations, the machine learning model is an image encoder (e.g., image encoder 510), and the another machine learning model is a sketch encoder (e.g., sketch encoder 520).

Figure 14:
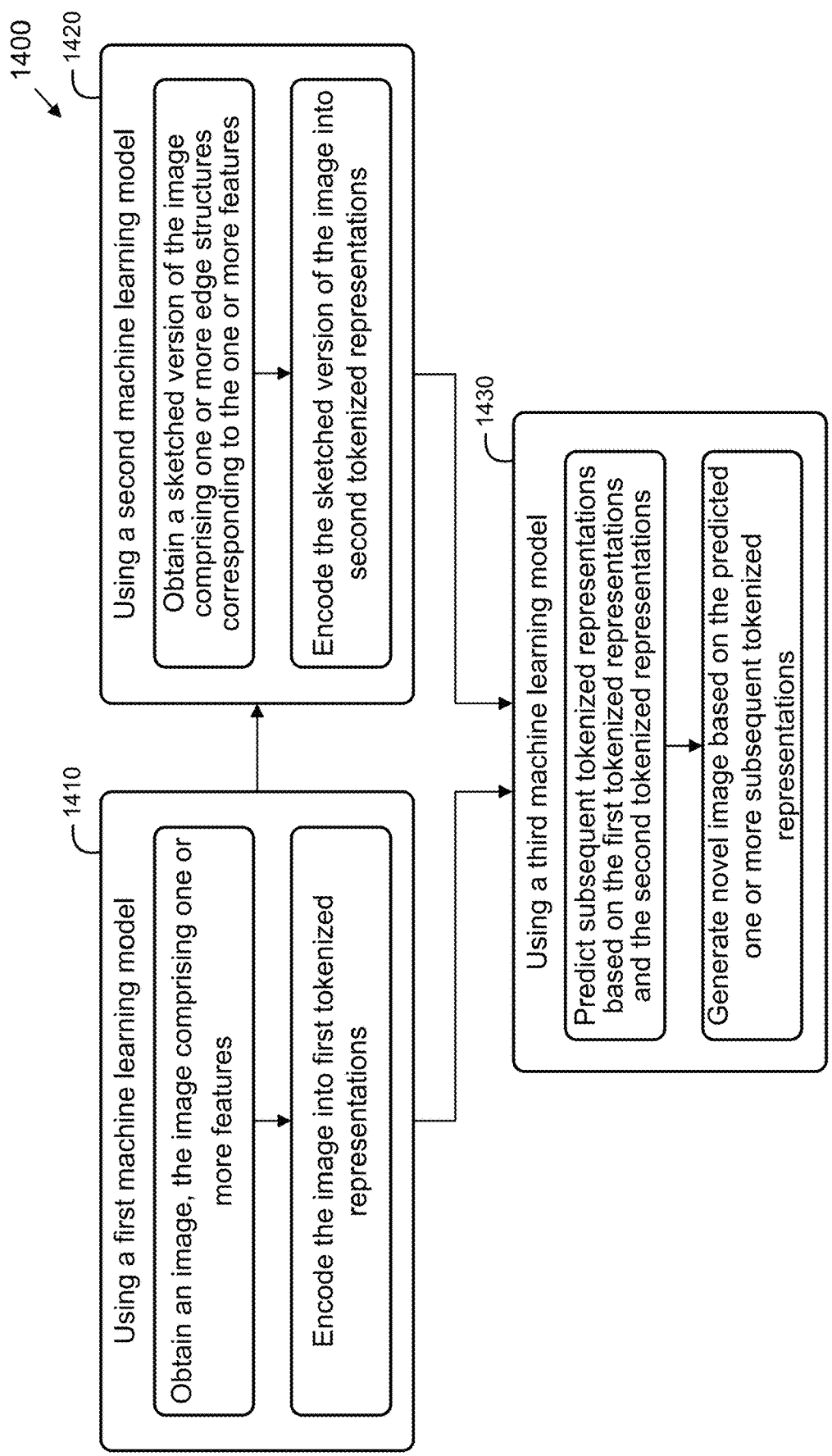
FIG. 14 is a flow diagram of another method for generating a novel image, in accordance with some embodiments.

FIG. 14 is a flow diagram of another method 1400 for generating a novel image, in accordance with some embodiments. In some embodiments, the functionality illustrated in one or more of the blocks shown in FIG. 14 is performed by hardware and/or software components of a suitable computerized system or apparatus, e.g., a user device (mobile or otherwise), a workstation, a server. In some implementations, the computerized system or apparatus is configured to operate the various components and modules implementing at least portions of the architectures of FIGS. 1, 5 and/or 6. In some aspects, a computer-readable apparatus including a storage medium stores computer-readable and computer-executable instructions that are configured to, when executed by at least one processor apparatus, cause the at least one processor apparatus or another apparatus (e.g., the computerized apparatus) to perform the operations of the method 1400. In some embodiments, a machine learning model implemented by an image encoder performs the operations of the method 1400. Example components of the computerized apparatus are illustrated in FIG. 15, which are described in more detail below.

It also should be noted that the operations of the method 1400 may be performed in a different suitable order, not necessarily the order depicted in FIG. 14. In some embodiments, at least some portions of the blocks may be performed substantially concurrently. Further, the method 1400 may include additional or fewer operations than those depicted in FIG. 14 to accomplish the generation of a novel image.

At block 1410, the method 1400 includes using a first machine learning model. In some embodiments, the first machine learning model is implemented by an image encoder implementing a first CNN. Image encoder model 104 and image encoder 510 are examples of the image encoder.

In some embodiments, the first machine learning model is trained to obtain an image, the image comprising one or more features. Images 112, 202, 702, 712 and 800 are examples of the image. Regions 206a, patterns 703a, 703c, 703d, and features 721-723 are examples of the one or more features of the image. In some embodiments, the first machine learning model is further trained to encode the image into first tokenized representations, e.g., according to the approach described with respect to FIGS. 5 and/or 6. In some implementations, the first CNN generates the first tokenized representations using convolution as described with respect to FIG. 3.

At block 1420, the method 1400 includes using a second machine learning model. In some embodiments, the second machine learning model is implemented by a sketch encoder implementing a second CNN. Sketch encoder model 102 and sketch encoder 520 are examples of the sketch encoder. The sketch encoder is a type of image encoder that is trained to obtain a sketched version of the image comprising one or more edge structures corresponding to the one or more features. Sketch images 110, 200, 704, 714, 716, 902, 912 and 1002 are examples of the sketched version of the image. In some embodiments, the second machine learning model is further trained to encode the sketched version of the image into second tokenized representations, e.g., according to the approach described with respect to FIGS. 5 and/or 6. In some implementations, the second CNN generates the second tokenized representations using convolution as described with respect to FIG. 3.

At block 1430, the method 1400 includes using a third machine learning model. In some embodiments, the third machine learning model is a transformer model. Transformer models 106 and 604 are examples of the transformer model. In some embodiments, the third machine learning model is trained to obtain the first tokenized representations and the second tokenized representations, e.g., from the image encoder and the sketch encoder, respectively. The third machine learning model is further trained to predict one or more subsequent tokenized representations taking into account the first tokenized representations and the second tokenized representations (e.g., according to the approach of FIG. 6), and generate the novel image based on the predicted one or more subsequent tokenized representations. In some implementations, the novel image is a reconstructed image that includes one or more "hallucinated" image features having image attributes (color, hue, shading, saturation, etc.) that are not present in the image obtained by the first machine learning model, but otherwise in the same or similar style as the image obtained by the first machine learning model.

In some implementations, the transformer model is configured to determine, based on a distribution function, probabilities of pixel values associated with the predicted one or more subsequent tokenized representations; and predict a plurality of pixel values based on the probabilities. In some implementations, the transformer model generates a histogram (e.g., the histogram 120 of FIG. 1), and the highest-probability value is selected as the pixel value for a given predicted tokenized representation. This is repeated to predict the plurality of pixel values based on the probabilities. In some implementations, the generation of the novel image is based on the predicted plurality of pixel values. For example, the novel image (e.g., a raster image such as an RGB image) is constructed using the pixel values.

In some cases, edge features in the sketched version of the image provide a hint as to the boundaries of structures in the image obtained by the first machine learning model. In some cases, the sketched version of the image indicate a blank region that can be represented by the second tokenized representations, and a reconstructed image having a blank area suitable for, e.g., copy space. In some cases, new variations (e.g., with different image attributes) of a user-sketched image are formed while maintaining the style of the image. In some cases, a user sketch is provided to generate one or more features having the same style as original features as the input image, and the generated and original features are combined in the reconstructed image (such as those shown in FIGS. 11A and 11B).

Apparatus

FIG. 15 shows a schematic diagram of components of a computing device 1500 that is implemented in a computing system in accordance with some implementations. As illustrated, computing device 1500 includes a bus 1512 that directly or indirectly couples one or more processors(s) 1502, a memory subsystem 1504, a communication interface 1506, an input/output (I/O) interface 1508, and/or one or more user interface components 1510. It should be noted that, in some embodiments, various other components are included in a computing device that are not shown in FIG. 15, and/or one or more components shown in FIG. 15 are omitted.

In some embodiments, computing device 1500 includes or is coupled to a memory subsystem 1504. Memory subsystem 1504 includes a computer-readable medium (e.g., non-transitory storage medium) or a combination of computer-readable media. Examples of computer-readable media include optical media (e.g., compact discs, digital video discs, or the like), magnetic media (e.g., hard disks, floppy disks, or the like), semiconductor media (e.g., flash memory, dynamic random access memory (DRAM), static random access memory (SRAM), electrically programmable read-only memory (EPROM), electrically erasable programmable read-only memory (EEPROM), or the like), or a combination thereof. In some embodiments, the computer-readable media includes non-volatile memory, volatile memory, or a combination thereof. In some embodiments, memory subsystem 1504 also includes one or more hardware devices such as a solid-state memory, one or more hard drives, one or more optical disk drives, or the like. In some embodiments, memory subsystem 1504 stores content files such as text-based files, audio files, image files, and/or video files, etc. In some implementations, the content files include documents, pictures, photos, songs, podcasts, movies, etc. In some embodiments, memory subsystem 1504 stores one or more computer program products that are each implemented as a set of instructions (e.g., program code) stored on a computer-readable medium.

A computer program product (e.g., a program stored in or downloadable onto a computer readable medium) includes instructions or program code that are executable by one or more processors (e.g., processor(s) 1502, or processor(s) of another computing device communicatively coupled to computing device 1500) to perform various operations or functions such as those described with reference to FIGS. 12 and 13. In some embodiments, a computer program product is referred to as a non-transitory computer readable medium storing or comprising instructions to perform certain operations or functions. Examples of a computer program product include firmware, software driver, operating system, or software application. Examples of a software application include data management application (e.g., file management application, document management application, media management application, database application, etc.), communication application (e.g., email application, messaging application, teleconference or meeting application, social media application, etc.), productivity application (e.g., document viewer application, document creation or editing application, etc.), media or interactive application (e.g., web browser, image or photo viewer, audio or video playback application, gaming application, virtual or augmented reality application, shopping application, recommendation or review application, etc.), creativity application (e.g., image, drawing, photo, audio, or video creation or editing application, web page development application, virtual or augmented reality creation or editing application, graphic design application, etc.), or the like.

In some embodiments, a computer program product such as any of the example software application are implemented using one or more neural network or machine learning models. In such embodiments, one or more neural network or matching learning models are trained using computing device 1500 (or a computing system that includes computing device 1500). Furthermore, in some implementations, computing device 1500 (or a computing system include computing device 1500) executes the one or more neural network or machine learning models as part of the computer program product to perform inference operations. It should be noted, in some embodiments, the neural network or matching learning model(s) are trained using a computing device or system that is the same as, overlaps with, or is separate from the computing device or system performing inference operations.

Communication interface 1506 is used by computing device 1500 to communicate with one or more communication networks, and/or other electronic device(s). Example types of communication networks include wired communication networks and/or wireless communication networks. Example types of communication networks include the Internet, a wide-area network, a local-area network, a virtual private network (VPN), an Intranet, or the like. In some embodiments, communication interface 1506 utilizes various drivers, wireless communication circuitry, network interface circuitry, or the like to enable communication via various communication networks.

I/O interface 1508 includes various drivers and/or hardware circuitry for receiving input from various input devices, providing output to various output devices, or exchanging input/output with various input/output devices. Examples of devices coupled to I/O interface 1508 include peripheral devices such as a printer, a docking station, a communication hub, a charging device, etc. In some implementations, some devices coupled to I/O interface 1508 are used as user interface component(s) 1510. In one example, a user operates input elements of user interface component(s) 1510 to invoke the functionality of computing device 1500 and/or of another device communicatively coupled to computing device 1500; a user views, hears, and/or otherwise experiences output from computing device 1500 via output elements of user interface component(s) 1510. Some user interface component(s) 1510 provide both input and output functionalities. Examples of input user interface component include a mouse, a joystick, a keyboard, a microphone, a camera, or the like. Examples of output user interface component include a display screen (e.g., a monitor, an LCD display, etc.), one or more speakers, or the like. Examples of a user interface components provide both input and output functionalities include a touchscreen, haptic feedback controllers, or the like.

Various embodiments are described herein which are intended to be illustrative. Alternative embodiments may be apparent to those of ordinary skill in the art without departing from the scope of the disclosure. In one example, one or more features from one embodiment are combined with another embodiment to form an alternative embodiment. In another example, one or more features are omitted from an embodiment to form an alternative embodiment without departing from the scope of the disclosure. Additionally, it should be noted that, in some implementations, certain features described herein are utilized without reference to other features described herein.

With reference to the various processes described above, it should be understood that the order in which operations are performed is not limited to the order described herein. Moreover, in some embodiments, two or more operations are performed concurrently and/or substantially in parallel. In some embodiments, what is described as a single operation is split into two or more operations (e.g., performed by the same device, performed by two or more different devices, etc.). In some embodiments, what is described as multiple operations is combined into a single (e.g., performed by the same device, etc.). Descriptions of various blocks, modules, or components as distinct should not be construed as requiring that the blocks, modules, or components be separate (e.g., physically separate) and/or perform separate operations. For example, in some implementations, two or more blocks, modules, and/or components are merged. As another example, a single block, module, and/or components is split into multiple blocks, modules, and/or components.

The phrases "in one embodiment," "in an embodiment," "in one example," and "in an example" are used herein. It should be understood that, in some cases, these phrases refer to the same embodiments and/or examples, and, in other cases, these phrases refer to different embodiments and/or examples. The terms "comprising," "having," and "including" should be understood to be synonymous unless indicated otherwise. The phases "A and/or B" and "A or B" should be understood to mean {A}, {B}, or {A, B}. The phrase "at least one of A, B, or C" and "at least one of A, B, and C" should each be understood to mean {A}, {B}, {C}, {A, B}, {A, C}, {B, C}, or {A, B, C}.

What is claimed is:

1. A method of generating a novel image, the method comprising:
   generating, via a first machine learning model, a first sequence of coded representations of a first image having one or more features;
   generating, via a second machine learning model, a second sequence of coded representations of a sketch image having one or more edge features associated with the one or more features of the first image, the sketch image comprising one or more sketch features provided directly over the one or more features of the first image;
   predicting, via a third machine learning model, one or more subsequent coded representations iteratively based on the first sequence of coded representations of the first image, the second sequence of coded representations of the sketch image, and one or more previously iteratively predicted coded representations; and
   based on the iterative predictions of the one or more subsequent coded representations, generating, via the third machine learning model, at least (i) a first portion of a reconstructed image which has one or more image attributes of the first image, and (ii) a second portion of the reconstructed image which is associated with the one or more edge features, the generating of the second portion of the reconstructed image comprising obtaining one or more new features based on the one or more sketch features.

2. The method of claim 1, wherein:
   the generating of the first sequence of coded representations of the first image comprises using a first convolutional neural network (CNN) to perform convolution on the first image; and
   the generating of the second sequence of coded representations of the sketch image using a second convolutional neural network (CNN) to perform convolution on the sketch image.

3. The method of claim 1, further comprising:
   obtaining an indication of a blank space within the reconstructed image, wherein the second sequence of coded representations comprise coded representations associated with the blank space; and
   based on the one or more subsequent coded representations, generating, via the third machine learning model, a featureless portion of the reconstructed image comprising the blank space without the one or more features, the second portion of the reconstructed image comprising the featureless portion.

4. The method of claim 1, wherein the first portion of the reconstructed image comprises the one or more edge features associated with the one or more features of the first image, and the second portion of the reconstructed image comprises one or more modified image attributes and different from the one or more image attributes of the first image, the one or more modified image attributes comprising an alteration to at least a color of the one or more features.

5. The method of claim 1, wherein the obtaining of the one or more new features comprises:
   outputting one or more new coded representations subsequent to the predicted one or more subsequent coded representations based on a sequence of coded representations of a second sketch image; and
   generating the one or more new features based on the one or more new coded representations;
   wherein the second portion of the reconstructed image comprises the one or more new features; and
   wherein the reconstructed image comprises the one or more features and the one or more new features.

6. The method of claim 1, wherein:
   the first machine learning model has been trained using one or more training images, and the second machine learning model has been trained using one or more training sketch images in conjunction with the first machine learning model; and
   the second machine learning model is configured to generate the second sequence of coded representations of the sketch image during inference without the first sequence of coded representations of the first machine learning model.

7. The method of claim 6, wherein:
   the first machine learning model comprises a Vector Quantized Variational Autoencoder (VQ-VAE);
   the third machine learning model comprises a transformer model configured to perform language modeling to predict the one or more subsequent coded representations based at least on the second sequence of coded representations of the sketch image; and
   the generating of the first and second portions of the reconstructed image comprises decoding the predicted one or more subsequent coded representations.

8. The method of claim 1, wherein:
   the reconstructed image comprises a first region and a second region;
   the first region comprises the one or more image attributes of the first image and at least a portion of the one or more edge features; and
   the second region comprises one or more second image attributes that differ from the one or more image attributes, omits the at least the portion of the one or more edge features, or a combination thereof.

9. A system of predicting a novel image, the system comprising:
   a first machine learning model trained to:
      obtain an image, the image comprising one or more features; and
      encode the image into first tokenized representations;
   a second machine learning model trained in conjunction with the first tokenized representations to:
      obtain a sketched version of the image comprising one or more edge structures corresponding to the one or more features of the image; and
      encode the sketched version of the image into second tokenized representations; and
   a third machine learning model trained to:
      obtain information associated with a blank space within the image;

obtain the first tokenized representations and the second tokenized representations, wherein the second tokenized representations comprise tokenized representations associated with the blank space;

iteratively predict one or more subsequent tokenized representations based on the first tokenized representations, the tokenized representations associated with the blank space, and at least one previously iteratively predicted coded representation; and generate the novel image based on the predicted one or more subsequent tokenized representations, the novel image comprising a portion associated with the one or more features of the image, and a portion associated with the blank space, the blank space comprising a featureless portion without the one or more features of the image.

10. The system of claim 9, wherein the third machine learning model is further trained to:

determine, based on a distribution function, probabilities of pixel values associated with the predicted one or more subsequent tokenized representations; and predict a plurality of pixel values based on the probabilities; and wherein the generation of the novel image is based on the predicted plurality of pixel values.

11. The system of claim 9, wherein the sketched version of the image is obtained based on user input.

12. The system of claim 9, wherein:

the first machine learning model is implemented by a first image encoder;

the second machine learning model is implemented by a second image encoder; and the third machine learning model is implemented by a transformer configured to perform a language modeling task to predict the one or more subsequent tokenized representations.

13. The system of claim 9, wherein the novel image comprises the one or more edge structures and an alteration of the one or more features.

14. The system of claim 9, wherein the novel image comprises one or more additional features based on the one or more edge structures.

15. A computer-readable apparatus comprising a non-transitory computer-readable storage medium, the storage medium comprising a plurality of instructions configured to, when executed by one or more processors, cause a machine learning model implemented by an image encoder to:

obtain one or more strokes representing one or more edge features of an input image, at least a portion of the one or more strokes provided directly over one or more features of the input image;

encode the one or more strokes into a plurality of image tokens associated with the one or more edge features and having a sequence; and cause iterative prediction of one or more subsequent image tokens accounting for the sequence of the plurality of image tokens, one or more previously predicted image tokens, or a combination thereof, the one or more subsequent image tokens being decodable into a reconstructed image having one or more reconstructed image features corresponding to the one or more edge features.

16. The computer-readable apparatus of claim 15, wherein the machine learning model has been trained by:

obtaining first training image tokens and second training image tokens, the first training image tokens generated by the machine learning model, the machine learning model configured to encode one or more portions of a training image, and the second training image tokens generated by another machine learning model, the another machine learning model configured to encode one or more portions of a training sketch image;

generating predictions of image tokens based on the first and second training image tokens; and performing an optimization process based on the predictions of image tokens and a ground truth.

17. The computer-readable apparatus of claim 15, wherein the iterative prediction of the one or more subsequent image tokens comprise prediction of one or more image tokens associated with an area of the reconstructed image where the one or more features of the input image are absent.

18. The computer-readable apparatus of claim 15, wherein the iterative prediction of the one or more subsequent image tokens comprise one or more image tokens associated with a modification of the one or more features of the image which are associated with the one or more edge features.

19. The computer-readable apparatus of claim 15, wherein the one or more subsequent image tokens comprise one or more image tokens associated with one or more additional features in the reconstructed image, the one or more additional features being based on the one or more strokes.

20. The computer-readable apparatus of claim 15, wherein:

the obtaining of the one or more strokes comprises obtaining a sketch image having the one or more strokes;

the encode of the one or more strokes into the plurality of image tokens comprises using a using a convolutional neural network (CNN) to perform at least one convolution on the sketch image; and the iteratively predicted one or more subsequent image tokens comprise one or more corresponding convolution values each representative of pixel information.

* * * * *